US012798169B2

(12) United States Patent
Esseghir et al.

(10) Patent No.: US 12,798,169 B2
(45) **Date of Patent: *Nov. 17, 2026**

(54) ULTRAHIGH TEMPERATURE, LOW SCORCH METHOD OF MAKING CROSSLINKABLE COMPOUND COMPOSITIONS

(71) Applicant: Dow Global Technologies LLC, Midland, MI (US)

(72) Inventors: Mohamed Esseghir, Monmouth, NJ (US); Saurav Sengupta, Gilbertsville, PA (US); Qian Gou, Collegeville, PA (US); Neil W. Dunchus, Kinnelon, NJ (US); Pieter A. Calon, Ijzendijke (NL)

(73) Assignee: Dow Global Technologies LLC, Midland, MI (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/851,424

(22) PCT Filed: Jun. 9, 2023

(86) PCT No.: PCT/US2023/024895

§ 371 (c)(1),
(2) Date: Sep. 26, 2024

(87) PCT Pub. No.: WO2023/244498

PCT Pub. Date: Dec. 21, 2023

(65) Prior Publication Data

US 2025/0214294 A1 Jul. 3, 2025

Related U.S. Application Data

(60) Provisional application No. 63/366,512, filed on Jun. 16, 2022.

(51) Int. Cl.

| | |
|---|---|
| ***C08J 3/24*** | (2006.01) |
| ***B29C 48/29*** | (2019.01) |
| ***C08K 5/14*** | (2006.01) |
| ***C08K 5/37*** | (2006.01) |
| ***C08K 5/5419*** | (2006.01) |

(52) U.S. Cl.

CPC ................. *B29C 48/29* (2019.02); *C08J 3/24* (2013.01); *C08K 5/14* (2013.01); *C08K 5/37* (2013.01); *C08K 5/5419* (2013.01); *B29C 2948/92561* (2019.02); *B29C 2948/92704* (2019.02); *C08K 2201/014* (2013.01)

(58) Field of Classification Search

CPC .... C08J 3/24; C08J 3/226; C08K 5/14; C08K 5/37; C08K 5/5419; C08K 2201/014; C08K 5/0025; C08K 5/005; C08K 5/01; B29C 2948/92561; B29C 2948/92704; B29C 2948/92209; B29C 2948/92066; B29B 7/726; B29B 7/88

USPC .......................................................... 523/348

See application file for complete search history.

(56) References Cited

U.S. PATENT DOCUMENTS

| | | | | |
|---|---|---|---|---|
| 3,335,124 | A | 8/1967 | Larsen | |
| 5,245,084 | A | 9/1993 | Groepper et al. | |
| 5,597,235 | A | 1/1997 | Barnes et al. | |
| 9,957,405 | B2 | 5/2018 | Sun et al. | |
| 10,941,278 | B2 | 3/2021 | Cai et al. | |
| 11,396,113 | B2 | 7/2022 | Labbe | |
| 2004/0075187 | A1 | 4/2004 | Christie | |
| 2020/0181374 | A1 | 6/2020 | Chaudhary | |
| 2020/0189166 | A1 | 6/2020 | Gou et al. | |
| 2020/0199270 | A1 | 6/2020 | Zhang et al. | |
| 2021/0139671 | A1 | 5/2021 | Chaudhary | |
| 2022/0036211 | A1 | 2/2022 | Silverstein et al. | |
| 2024/0376275 | A1* | 11/2024 | Esseghir | C08J 3/247 |

FOREIGN PATENT DOCUMENTS

| | | |
|---|---|---|
| CN | 101747553 | 6/2010 |
| CN | 109370003 | 2/2019 |
| DE | 2553094 | 8/1976 |
| DE | 2553145 | 8/1976 |
| EP | 253561 | 1/1988 |
| EP | 2468813 | 6/2012 |
| EP | 3253561 | 5/2019 |
| GB | 1386616 | 3/1975 |
| GB | 1535038 | 12/1978 |
| JP | 59215347 | 12/1984 |
| WO | 2013112781 | 8/2013 |
| WO | 2019000311 | 1/2019 |
| WO | 2019000654 | 1/2019 |
| WO | 2019046149 | 3/2019 |

OTHER PUBLICATIONS

International Preliminary Report on Patentability from corresponding European Patent Application No. 23744585.3 dated Dec. 10, 2024.

* cited by examiner

*Primary Examiner* — Hannah J Pak

(57) ABSTRACT

An ultrahigh temperature, low scorch method of rapidly making a crosslinkable compound composition comprising a homogeneous mixture of a thermoplastic polyolefin, antioxidant, and curative additives comprising one or more organic peroxides and one or more multialkenyl crosslinking coagents. The method avoids soaking towers and lengthy soaking times, and yet makes a fully crosslinkable, homogeneous compound composition with minimal or no premature crosslinking of the thermoplastic polyolefin(s).

8 Claims, 3 Drawing Sheets

ULTRAHIGH TEMPERATURE, LOW SCORCH METHOD OF MAKING CROSSLINKABLE COMPOUND COMPOSITIONS

The technical field includes methods of making crosslinkable polyolefin formulations.

Patents in the field include U.S. Pat. Nos. 5,245,084 and 9,957,405 B2; and U.S. Pat. No. 10,941,278 B2. Patent application publications in the field include CN 101747553 A; CN 109370003 A; EP 3 192 633 A1; GB 1535038A; US 2020/0181374 A1; US 2020/0189166 A1; US 2021/0139671 A1; WO 2013/112781 A1; WO 2019/000311 A1; and WO 2019/000654 A1.

INTRODUCTION

The decades old method for preventing premature crosslinking or "scorch" of organic peroxide-containing crosslinkable polyolefin compositions is to soak the organic peroxide into granulates of a peroxide-free penultimate composition comprising polyolefin and non-curative additives (e.g., antioxidants). This is done on large scale using one or more soaking towers. First the peroxide-free granulates are made by melt compounding the non-curative additives into a melt of the polyolefin, followed by granulating (e.g., pelletizing) the resulting compounded mixture to give solid granulates of the peroxide-free penultimate composition. The melt compounding/granulating steps can be done quickly, in less than one hour total. Next the pellets are added to the soaking tower(s) and the organic peroxide is soaked into the solid granulates at a temperature that is well below the —O—O— bond cleavage temperature of the organic peroxide (e.g., 50° to 80 °C for dicumyl peroxide) and the melting temperature of the solid granulates, but high enough to speed migration of the organic peroxide into the solid granulates. Soaking usually takes 6 to 12 hours, which undesirably gives an overall production time that is multiples of the melt compounding/granulating time. Also, soaking may undesirably yield nonhomogeneous soaked granulates having a concentration gradient of the organic peroxide with more at the surfaces and less in the centers of the solid granulates. Also, the soaking towers undesirably add 35% to 50% additional expense to the cost of building a new production line.

SUMMARY

The present inventors discovered an ultrahigh temperature, low scorch method of rapidly making a crosslinkable compound composition comprising a homogeneous mixture of a thermoplastic polyolefin, antioxidant, and curative additives comprising one or more organic peroxides and one or more multialkenyl crosslinking coagents. The method avoids soaking towers and lengthy soaking times, and yet makes a fully crosslinkable, homogeneous compound composition with minimal or no premature crosslinking of the thermoplastic polyolefin(s).

BRIEF DESCRIPTION OF THE DRAWING(S)

DETAILED DESCRIPTION

Figure 1:
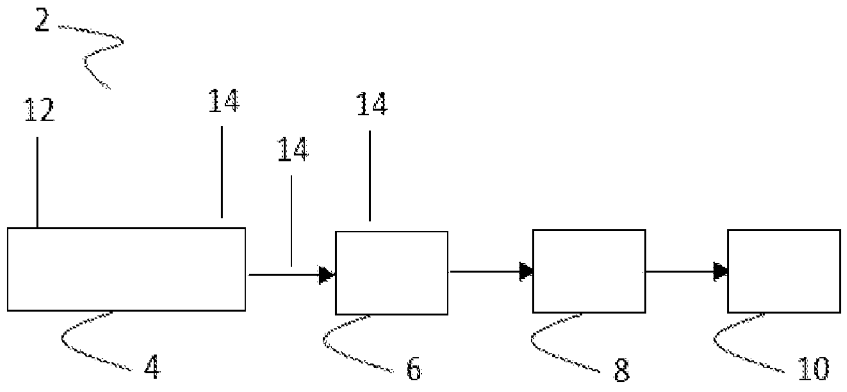
FIG. 1 depicts an example of a melt compounding line (2) useful in the inventive method.

Described is an ultrahigh temperature, low scorch method of rapidly making a crosslinkable compound composition comprising a homogeneous mixture of a thermoplastic polyolefin, antioxidant, and curative additives comprising one or more organic peroxides and one or more multialkenyl crosslinking coagents. The method avoids soaking towers and lengthy soaking times, and yet makes a fully crosslinkable, homogeneous compound composition with minimal or no premature crosslinking of the thermoplastic polyolefin(s).

The method may be adapted for making extruded articles. Examples of the extruded articles are coatings, films, and laminates. The extruded articles also include pellets of the crosslinkable compound composition, which can be stored and later melt extruded into the foregoing articles. Because the extent of premature crosslinking or scorch experienced during the method is so little, the crosslinkable compound composition in the extruded articles is fully curable to make cured articles. These include fully-cured insulation layers of electrical power and telecommunications cables.

Beneficially the inventive method is more efficient, faster, and cheaper than a comparative method based on soaking an organic peroxide as described later. The improved efficiency of the inventive method comprises using fewer unit operations (e.g., no soaking towers) and may use less energy than the comparative method. The method is flexible in that it can be adapted to different embodiments.

An embodiment includes an ultrahigh temperature, low-scorch, including no scorch, method of making a crosslinkable compound composition comprising a homogeneous mixture of one or more thermoplastic polyolefins, one or more antioxidants, and a combination of curative additives comprising one or more organic peroxides (C—O—O—C containing compounds) and one or more multialkenyl crosslinking coagents (non-polymeric compounds containing two or more alkenyl groups, which may be selected from the group consisting of: vinyl, allyl, acryloyl, and methacryloyl), the method comprising: providing melt compounding device (e.g., an extruder) sequentially having a solids conveying section (including a device, e.g., a hopper for conveying polymer solids), a melting/mixing zone, and an ultrahigh temperature mixing zone, wherein the temperature of the ultrahigh temperature mixing zone is from 150.1° to 180.0 °C, alternatively from 155° to 174 °C, alternatively from 159° to 172 °C, alternatively from 162° to 171 °C; feeding to the melting/mixing zone of the melt compounding device (e.g., extruder) any one of materials (a) to (c): (a) a pellets/coagent(s) premixture made by contacting solid pellets of an intermediate compound, which at the start comprises one or more thermoplastic polyolefins and one or more antioxidants, but lacks peroxides and multialkenyl crosslinking coagents, with one or more multialkenyl crosslinking coagents ("coagent(s)"), or (b) a pellets/coagent(s)/organic peroxide(s) premixture made by contacting solid pellets of an intermediate compound, which at the start comprises one or more thermoplastic polyolefins and one or more antioxidants, but lacks peroxides and multialkenyl crosslinking coagents, with a combination of curative additives comprising one or more multialkenyl crosslinking coagents ("coagent(s)") and one or more organic peroxides ("organic peroxide(s)"); or (c) solid pellets of an intermediate compound, which at the start comprises one or more thermoplastic polyolefins and one or more antioxidants, but lacks peroxides and multialkenyl crosslinking coagents, wherein material (c) lacks curative additives; melting and first mixing the one or more thermoplastic polyolefins with the other constituents of the material (a), (b), or (c) for 15 to 35 seconds to yield an initial melted mixture thereof in the melting/mixing zone; moving the initial melt mixture into the ultrahigh temperature mixing zone of the melt compounding device (e.g., extruder); optionally injecting one or more multialkenyl crosslinking coagents and/or one or more organic peroxides (collectively "curative additive(s)") into the initial melt in the ultrahigh temperature mixing zone, wherein the injecting of one or more organic peroxides is performed (is not optional) if the material (a) is fed and the injecting of one or more multialkenyl crosslinking coagents and/or one or more organic peroxides is performed (is not optional) if the material (c) is fed; and second mixing the material (a), (b), or (c) and any injected curative additive(s) in the ultrahigh temperature mixing zone for 10 to 20 seconds; and discharging the resulting crosslinkable compound composition from the melt compounding device (e.g., extruder); wherein the total residence time of the material (a) (e.g., in FIG. 4), material (b) (e.g., in FIG. 5), or material (c) (e.g., in FIG. 6) in the melt compounding device (e.g., extruder) is from 25 to 55 seconds and wherein the total residence time of any injected curative additive(s) in the melt compounding device (e.g., extruder) is from 10 to 30 seconds, alternatively from 10 to 20 seconds. The injected curative additive(s) would be injected directly into injection sites (14) in FIGS. 1 to 3 or into the "Ultrahigh Temp. Mixing Zone" in FIGS. 4 to 6. In some embodiments the discharging step comprises conveying the crosslinkable compound composition to a post-compounding device (e.g., a pelletizer or an extruder or a system comprising a melt pump, a melt screen, and the pelletizer or the extruder), as described below. The residence time in the melt compounding device does not include residence time in the post-compounding device, if any. If used the post-compounding device is different than and downstream from the melt compounding device.

The above-described method may comprise an aspect wherein the material (a) is fed and the injecting is performed comprising injecting the one or more organic peroxides, and optionally one or more additional multialkenyl crosslinking coagents, into the initial melt in the ultrahigh temperature mixing zone of the melt compounding device (e.g., extruder) and the second mixing step comprises mixing the material (a) and the injected curative additives. In some embodiments the one or more additional multialkenyl crosslinking coagents are not injected. In other embodiments at least one additional multialkenyl crosslinking coagent is injected. This aspect is illustrated in FIG. 4.

Figure 4:
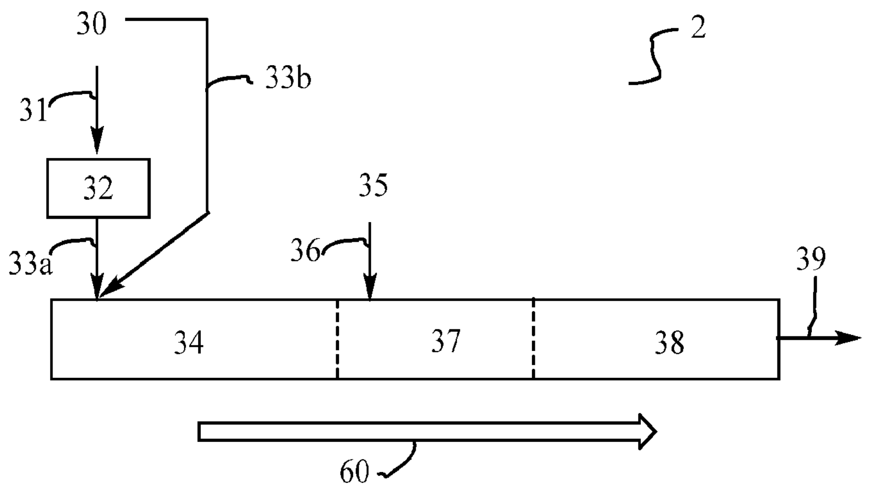
FIG. 4 illustrates an embodiment wherein material (a) is fed.

In FIG. 4, melt compounding device 2 comprises melting and mixing zone 34, ultrahigh temperature mixing zone 37, and discharge zone 38. Melt compounding device 2 may be or may not be configured with optional in-line pre-blender 32. Feed material (a) 30 comprises at least one thermoplastic polyolefin (TPO) polymer, at least one multi-alkenyl crosslinking coagent, but no organic peroxide. In one embodiment that uses in-line pre-blender 32, the feed material (a) 30 is fed 31 into the in-line pre-blender 32, subjected to pre-blending therein, and the resulting pre-blend is fed 33*a* into melting and mixing zone 34 of the melt compounding device 2. In another embodiment that does not use in-line pre-blender 32, feed material (a) 30 is fed directly 33*b* into the melting and mixing zone 34 of the melt compounding device 2. Material is passed through melt compounding device 2 in a from left-to-right flow direction indicated by arrow 60. After either embodiment is subjected to processing in melting and mixing in zone 34 the resulting material is passed into ultrahigh temperature mixing zone 37 and at the same time one or more organic peroxides 35 are injected 36 into the passed material in ultrahigh temperature mixing zone 37. Each of the one or more organic peroxides may be injected 36 either separately or as a mixture thereof. After ultrahigh temperature mixing according to the invention, the resulting material containing injected organic peroxide(s) is passed into discharge zone 38 and then discharged 39 from the melt compounding device 2.

The one or more multialkenyl crosslinking coagents of material (a) does/do not include α-methyl styrene dimer ("AMSD") because AMSD has only one alkenyl group per molecule as shown by its structure:

(AMSD)

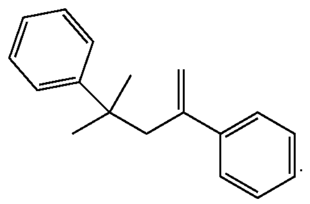

The above-described method (paragraph [0015]) alternatively may comprise an aspect wherein the material (b) is fed and the injecting is not performed and the second mixing step comprises mixing material (b) and wherein no additional curative additives are injected. This aspect is illustrated in FIG. 5.

Figure 5:
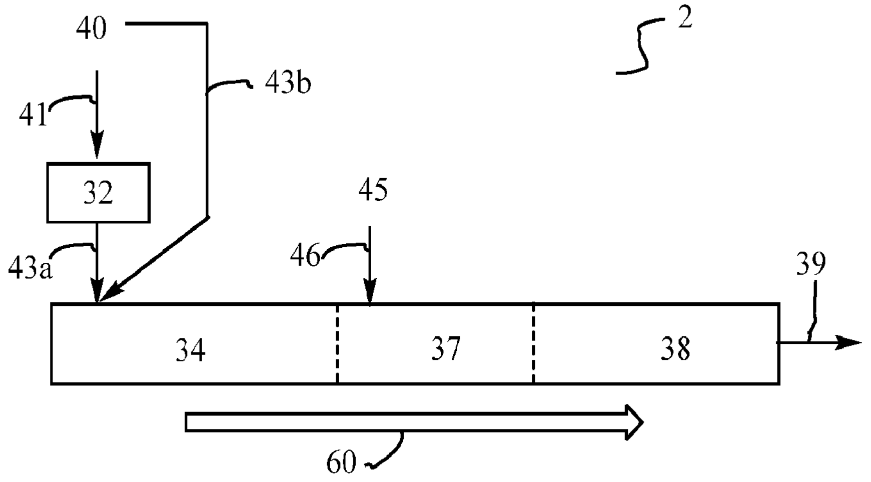
FIG. 5 illustrates an embodiment wherein material (b) is fed.

In FIG. 5, melt compounding device 2 comprises melting and mixing zone 34, ultrahigh temperature mixing zone 37, and discharge zone 38. Melt compounding device 2 may be or may not be configured with optional in-line pre-blender 32. Feed material (b) 40 comprises at least one thermoplastic polyolefin (TPO) polymer, at least one antioxidant, at least one multi-alkenyl crosslinking coagent, and at least one organic peroxide. In one embodiment that uses in-line pre-blender 32, the feed material (b) 40 is fed 41 into the in-line pre-blender 22, subjected to pre-blending therein, and the resulting pre-blend is fed 43*a* into melting and mixing zone 34 of the melt compounding device 2. Fed material is passed through melt compounding device 2 in a from left-to-right flow direction indicated by arrow 60. In another embodiment that does not use in-line pre-blender 32, feed material (b) 40 is fed directly 43*b* into the melting and mixing zone 34 of the melt compounding device 2. After either embodiment is subjected to processing in melting and mixing in zone 34 the resulting material is passed into ultrahigh temperature mixing zone 37 and, optionally if desired, at the same time one or more additional additives 45 selected from one or more organic peroxides and/or one or more additional multi-alkenyl crosslinking coagents, are injected 46 into the passed material in ultrahigh temperature mixing zone 37. Each of the one or more additional organic peroxides, if any, and/or one or more additional multi-alkenyl crosslinking coagents, if any, may be injected 46 either separately or as a mixture thereof or some separately and some in a mixture when three or more are injected 46. After ultrahigh temperature mixing according to the invention, the resulting material, optionally containing injected additional additives, is passed into discharge zone 38 and then discharged 39 from the melt compounding device 2.

In some embodiments the one or more multialkenyl crosslinking coagents of material (b) is vinyl-D4 and the organic peroxide of material (b) is dicumyl peroxide.

The above-described method (paragraph [0015]) may comprise an aspect wherein the material (b) is fed and the injecting step is performed and comprises injecting one or more additional multialkenyl crosslinking coagents and/or one or more additional organic peroxides into the initial melt in the ultrahigh temperature mixing zone of the melt compounding device (e.g., extruder) and the second mixing step comprises mixing the material (b) and the injected curative additives. In some embodiments at least one additional multialkenyl crosslinking coagent is injected, but an additional organic peroxide is not injected. In other embodiments at least one additional organic peroxide is injected, but an additional multialkenyl crosslinking coagent is not injected. In other embodiments at least one additional multialkenyl crosslinking coagent is injected and at least one additional organic peroxide is injected. This aspect is illustrated in FIG. 5. In some embodiments the one or more multialkenyl crosslinking coagents of material (b) is vinyl-D4 and the organic peroxide of material (b) is dicumyl peroxide and the injecting step comprises injecting an additional multialkenyl crosslinking coagent that is triallyl isocyanurate (TAIC).

The above-described method (paragraph may comprise an aspect wherein the material (c) is fed, the method comprising feeding the pellets of the intermediate compound into the melting/mixing zone of the melt compounding device (e.g., extruder) to yield a melt of an intermediate compound comprising the one or more thermoplastic polyolefins and the one or more antioxidants, but lacking peroxides and multialkenyl crosslinking coagents, wherein the melt of the intermediate compound is at a melt temperature of 150.1° to 180.0 °C, alternatively from 155° to 174 °C, alternatively from 159° to 172 °C, alternatively from 162° to 171 °C; injecting the combination of curative additives comprising the one or more organic peroxides and the one or more multialkenyl crosslinking coagents into the melt of the intermediate compound; and mixing the combination of curative additives into the melt of the intermediate compound to make the crosslinkable compound composition in the form of a melt comprising the homogeneous mixture, wherein the homogeneous mixture is formed in from 20 seconds to less than 60 seconds after completion of the injecting step. If the mixing step is terminated in less than 20 seconds, the mixture may not be fully homogeneous. If the mixing step is extended beyond 60 seconds, the homogeneous mixture may suffer from scorch. This aspect is illustrated in FIG. 6.

Figure 6:
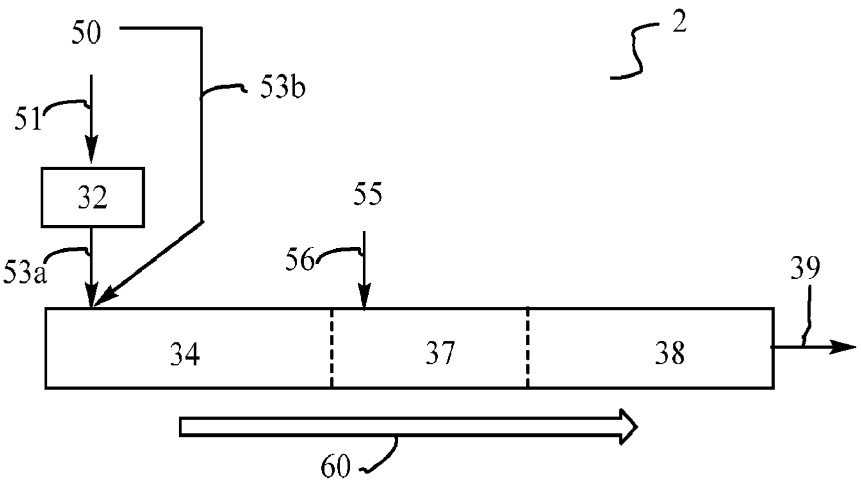
FIG. 6 illustrates an embodiment wherein material (c) is fed.

In FIG. 6, melt compounding device 2 comprises melting and mixing zone 34, ultrahigh temperature mixing zone 37, and discharge zone 38. Melt compounding device 2 may be or may not be configured with optional in-line pre-blender 32. Feed material (c) 50 comprises at least one thermoplastic polyolefin (TPO) polymer, at least one antioxidant, but no multi-alkenyl crosslinking coagent and no organic peroxide. In one embodiment that uses in-line pre-blender 32, the feed material (c) 50 is fed 51 into the in-line pre-blender 32, subjected to pre-blending therein, and the resulting preblend is fed **53*a* into melting and mixing zone 34 of the melt compounding device 2. In another embodiment that does not use in-line pre-blender 32, feed material (c) 50 is fed directly 53*b* into the melting and mixing zone 34 of the melt compounding device 2. Material is passed through melt compounding device 2 in a from left-to-right flow direction indicated by arrow 60. After either embodiment is subjected to processing in melting and mixing in zone 34 the resulting material is passed into ultrahigh temperature mixing zone 37 and at the same time the combination of curative additives 55 comprising one or more organic peroxides and one or more multialkenyl crosslinking coagents is injected 56 into the passed material in ultrahigh temperature mixing zone 37. Each of the one or more organic peroxides and one or more multi-alkenyl crosslinking coagents may be injected 56 either separately or as a mixture thereof or some separately and some in a mixture when three or more are injected 56. After ultrahigh temperature mixing according to the invention, the resulting material containing injected combination of curative additives 55 is passed into discharge zone 38 and then discharged 39 from the melt compounding device 2**.

The above-described method (paragraph [0019]) may comprise an aspect which is adapted to a melt compounding device, which may be a screw extruder, alternatively a single-screw extruder or a twin-screw extruder, the melt compounding device defining a conveying pathway therethrough and comprising, in series along the conveying pathway, at least the following zones: a melting/compounding zone configured for heating thermoplastic polyolefins above their melting temperatures and blending antioxidants thereinto and having one or more feed ports (a.k.a., feed points) for feeding one or more materials (e.g., pellets comprising thermoplastic polyolefins and antioxidants or antioxidant-free pellets comprising thermoplastic polyolefins and separate source of antioxidants) into the melting/compounding zone (e.g., from an external hopper, external feed line, or external storage tank), a mixing zone configured for rapid blending of curative additives into polymer melts and having one or more injection ports (a.k.a., injection points) located therebetween for injecting one or more materials including the curative additives into the mixing zone (e.g., from an external storage tank or feed line), and an output zone for discharging a melt stream of compounded material from the melt compounding device to a post-compounding device (e.g., a pelletizer or an extruder or a system comprising a melt pump, a melt screen, and the pelletizer or the extruder); the method comprising: (A) providing the melt of the intermediate compound to, or making the melt of the intermediate compound in, the melting/compounding zone; (B) conveying the melt of the intermediate compound into the mixing zone; (C) injecting, via at least one of the one or more injection ports of the mixing zone, the combination of curative additives comprising the one or more organic peroxides and the one or more multialkenyl crosslinking coagents into the melt of the intermediate compound; and (D) mixing the combination of curative additives and the melt of the intermediate compound in the mixing zone to make the melt of the crosslinkable compound composition comprising the homogeneous mixture, wherein the homogeneous mixture is formed in from 20.0 to 60.0 seconds after completion of the injecting step; and (E) conveying the melt of the crosslinkable compound composition to the output zone.

The above-described method (paragraph or [0020]) comprise an aspect comprising post-output zone steps adapted to a pelletizer machine configured with a strand die (e.g., a multi-strand die), cooling means (e.g., a water bath), and a cutting device (e.g., a rotating knife blade), the post-output zone steps comprising conveying the melt of the crosslinkable compound composition from the output zone of the melt compounding device into the pelletizer machine; extruding a strand of the crosslinkable compound composition; cooling the strand; and cutting the strand to make solid pellets of the crosslinkable compound composition.

The above-described method (paragraph or [0020]) may comprise an aspect comprising post-output zone steps adapted to an insulation extrusion machine configured with an annular die for extrusion coating a filament, the post-output zone steps comprising, conveying the melt of the crosslinkable compound composition from the output zone of the melt compounding device into the insulation extrusion machine; extruding a layer of the crosslinkable compound composition onto a conductor to make a coated conductor; and curing the crosslinkable compound composition of the insulation layer to make the cable. In some embodiments the conductor comprises one or more electrically conductive wires, one or more light-transmitting glass fibers ("fiber optics"), or a combination thereof; and wherein the insulation layer comprises a crosslinked polyolefin product.

The above-described method (paragraphs to [0022]) may comprise an aspect wherein the injecting step has limitation (i) or limitation (ii): (i) wherein the injecting step consists of injecting the combination of curative additives together as a mixture thereof, or (ii) wherein the injecting step consists of injecting at least one, alternatively all but one, alternatively each of the curative additives separately from the other curative additives.

The above-described method may comprise an aspect wherein the one or more thermoplastic polyolefins are chosen for high temperature/low scorch manufacturing an insulation layer of a cable at high production speed with low scorch, wherein such one or more thermoplastic polyolefins have any one of limitations (i) to (iii): (i) wherein there is one or more thermoplastic polyolefins and at least one, alternatively each, of the one or more thermoplastic polyolefins independently is a low-density polyethylene having a density from 0.870 to 0.940 g/$cm^3$, measured in accordance with ASTM D792, Method B; and a melt index ($I_2$) of from 1 to 20 g/10 minutes, as determined in accordance with ASTM D1238 at 190 °C and 2.16 kg; or (ii) wherein there is one or more thermoplastic polyolefins and each is independently selected from the group consisting of: polyethylene homopolymers, ethylene/1-butene copolymers, ethylene/1-hexene copolymers, and ethylene/1-octene copolymers; or (iii) a combination of limitations (i) and (ii).

The above-described method may comprise an aspect wherein the additives are chosen for high temperature/low scorch manufacturing an insulation layer of a cable, wherein such additives have any one of limitations (i) to (v): (i) the one or more antioxidants comprising a thio-based antioxidant, alternatively a mixture of two or more thio-based antioxidants alternatively two or more antioxidants comprising lauryl thiodipropionate and stearyl thiodipropionate; or (ii) wherein the one or more multialkenyl crosslinking coagents comprises an alkenyl group-containing monocyclic organosiloxane of formula (I): $[R^1, R^2SiO_{2/2}]_n$ (I), wherein subscript n is an integer greater than or equal to 3; each $R^1$ is independently a $(C_2\text{-}C_4)$alkenyl or a $H_2C{=}C(R^{1a})—C({=}O)—O—(CH_2)_m—$, wherein $R^{1a}$ is H or methyl and subscript m is an integer from 1 to 4; and each $R^2$ is independently H, $(C_1\text{-}C_4)$alkyl, phenyl, or $R^1$, alternatively 2,4,6,8-tetramethyl-2,4,6,8-tetravinyl-tetracyclosiloxane; or (iii) a combination of limitations (i) and (ii); (iv) wherein the one or more organic peroxides comprises dicumyl peroxide or a cumyl group-containing peroxide, alternatively comprising dicumyl peroxide; or (v) a combination of limitation (iv) and any one of limitations (i) to (iii).

The above-described method may comprise an aspect wherein the crosslinkable compound composition is formulated for high temperature/low scorch manufacturing a crosslinkable insulation layer of a cable, wherein such crosslinkable compound composition has any one of limitations (i) to (iii): (i) the crosslinkable compound composition has: a scorch time (ts1) at 140 °C of at least 63 minutes, alternatively at least 79 minutes, reported as the time required at 140 °C for an increase of 1 poundforce-inch (lbf-in) or 1.13 deciNewton-meter (dN-m) from minimum torque ("ML"), as determined by moving die rheometer (MDR) testing in accordance with ASTM procedure D5289, and a maximum torque (MH) at 182 °C that is at least 1.67 deciNewton-meter (dN-m; equal to at least 1.48 lbf-in) higher than minimum torque (ML) at 182 °C, alternatively MH is at least 1.72 dN-m higher (at least 1.52 lbf-in higher) than ML at 182 °C and MH at 182 °C is at least 1.79 dN-m (1.58 lbf-in), alternatively at least 1.83 dN-m (1.62 lbf-in), as determined by moving die rheometer (MDR) testing in accordance with ASTM procedure D5289; or (ii) the crosslinkable compound composition has a hot creep elongation at 200 °C of less than 130%, alternatively less than 100%, by testing in accordance with ICEA T-28-562a; or (iii) a combination of limitations (i) and (ii).

The above-described method may be further defined as described below.

If desired when feeding material (a) or material (b), a solids blender may be used to pre-mix the solid pellets with either the one or more multialkenyl crosslinking coagent of material (a) or the one or more multialkenyl crosslinking coagents and one or more organic peroxides of material (b) to give the respective premixture, which is then fed into the melting/mixing zone of the extruder.

The method. Without being bound by theory it is believed that the inventive method makes a crosslinkable compound composition at the temperature range described earlier and inherently having the ts1 at 140 °C and maximum torque (MH) at 182 °C described earlier. This is evidence of the ultrahigh temperature, low scorch, crosslinkability features of the inventive method. Without being bound by theory it is believed that the melt compounding temperature of 150.1° to 180.0 °C is unusually high for achieving these features.

The inventive method of injecting and rapidly mixing (in less than 60 seconds) organic peroxide and one or more multialkenyl crosslinking coagents into a melt stream of the intermediate compound provides the crosslinkable compound composition rapidly, even before it has cooled from processing.

Without being bound by theory we believe that for minimizing scorch of the crosslinkable compound composition, the method embodiments that comprise feeding material (a), which comprises the intermediate compound and one or more multialkenyl crosslinking coagents, but does not include organic peroxides, into the melting and mixing zone, and later injecting all of the one or more organic peroxide(s) into the ultrahigh temperature mixing zone, are superior to the method embodiments that comprise feeding material (c), which comprises the intermediate compound, but does not include any curative additives, into the melting and mixing zone, and later injecting all of the curative additives into the ultrahigh temperature mixing zone. This is because the multialkenyl crosslinking coagent(s) may have a scorch-inhibiting effect, which is maximized by the former method embodiments that feed material (a) and premix the multialkenyl crosslinking coagent into and throughout the initial melt before the initial melt is injected with the organic peroxide(s). In contrast, the latter method embodiments that feed material (c) only and later injects both the multialkenyl crosslinking coagents and the organic peroxide(s) into the initial melt may have portions that could be contacted with the organic peroxide(s) before they are contacted with the coagent(s).

Likewise for analogous reasons we believe that the method embodiments that comprise feeding material (b), which comprises the intermediate compound and at least one multialkenyl crosslinking coagent and at least one organic peroxide, into the melting and mixing zone, and later optionally injecting additional coagent(s) and/or additional organic peroxide(s), into the ultrahigh temperature mixing zone are also effective for making the crosslinkable compound composition and may superior to the method embodiments that comprise feeding material (c).

Therefore, since the method embodiments that comprise feeding material (c) may be less effective at inhibiting scorch of the crosslinkable compound composition than the method embodiments that comprise feeding material (a) or (b), we describe the former method embodiments and provide working examples that illustrate those method embodiments work, and therefore the method embodiments comprising feeding material (a) or (b) will also work.

Injecting the curative additives during melt compounding step does not require a melt cooling step or post-compounding soaking step to make the crosslinkable compound composition. The inventive method consistently provides fully-formulated crosslinkable compound compositions without a melt cooling step or use of soaking the thermoplastic polyolefin with crosslinking initiator. The homogeneous mixture made by the method comprises a fully incorporated organic peroxide and crosslinking coagent solely upon completion of the mixing step. In contrast to a comparative crosslinkable compound composition made by soaking the curative additives into pellets of the intermediate compound is not homogeneous but may have a concentration gradient of curative additives higher at surfaces of the pellets and decreasing towards centers of the pellets.

The providing step. The providing step may be adapted for use with pressurizing and/or melt screening of the melt of the intermediate compound prior to the injecting step. In some embodiments of the method, such as is described above, the method comprising, prior to the injecting step and upstream of the mixing zone of the melt compounding device: pumping the melt of the intermediate compound through a first melt pump to make a pressurized melt stream of the intermediate compound; and melt screening the pressurized melt stream of the intermediate compound through a melt screen that is located upstream of all of the one or more injection ports of the mixing zone of the melt compounding device such that the melt of the intermediate compound in the mixing zone is melt screened.

The providing step may be adapted to control the overall melt temperature of the melt stream of the intermediate compound. These embodiments of the method may comprise adding a solid feed of a second polymer downstream of the primary solid feed of the thermoplastic polyolefin polymer, such as at any point upstream of every injection point or adjacent to the injection point furthest upstream, and melt compounding the second feed. Because the second polymer is in solid form it is intrinsically at a lower temperature than that of the melt stream of the intermediate compound. By introducing a controlled amount of the second polymer, such as at a weight ratio of second polymer feed to the initial polymer feed of from 1:1 to 1:4, alternatively from 1:2 to 1:4, the overall melt temperature of the melt stream of the intermediate compound and the resulting crosslinkable compound can be lowered significantly without falling below the minimum 150 °C. The melt stream of the intermediate compound is at a temperature sufficient to melt the second polymer solids and achieve improved temperature control over the melt stream, i.e., lower or maintain the melt temperature within the range from 150° to 180 °C.

The injecting step. The injecting step may be adapted for use with different types and arrangements of injection ports and with or without melt screening. In some embodiments the injection points for injecting the curative additives may comprise both of (i) a distributive mixing or kneading section at a downstream end of the melt compounding device and (ii) an injection point downstream of melt formation in the melt compounding device itself; both of (i) a distributive mixing or kneading section at a downstream end of the melt compounding device and (iii) downstream of a melt screen located downstream of the melt compounding device yet upstream of a separate melt pump; (i) a distributive mixing or kneading section at a downstream end of the melt compounding device and (iv) upstream of a second melt pump located at a point which is downstream of both the separate melt pump and the melt screen in (iii); both of (ii) an injection point downstream of melt formation in the melt compounding device itself and (iii) downstream of a melt screen located downstream of the melt compounding device yet upstream of a separate melt pump; both of (ii) an injection point downstream of melt formation in the melt compounding device itself and (iv) upstream of a second melt pump located at a point which is downstream of both the separate melt pump and the melt screen in (iii); or both of (iii) downstream of a melt screen located downstream of the melt compounding device yet upstream of a separate melt pump and (iv) upstream of a second melt pump located at a point which is downstream of both the separate melt pump and the melt screen in (iii). In some embodiments the injection points for injecting the curative additives may include any three of injection points (i) to (iv), alternatively each of (i) to (iv).

The injection point or points may be located downstream of a melt screen which is itself located downstream of the melt pump. The melt compounding device may comprise a twin melt pump arrangement further comprising a second downstream melt pump and a melt screening device located between the melt pump and the second downstream melt pump; the two melt pumps straddle the melt screen. In the twin melt pump version, injecting the combination of curative additives comprises melt pumping the melt stream of the intermediate compound to make a pressurized melt stream, melt screening the pressurized melt stream of the intermediate compound and injecting into the melt stream the combination of curative additives at an injection point downstream of the melt screen, which point can be in or just upstream of the second downstream melt pump.

The mixing step. The mixing step is configured to rapidly make the homogeneous mixture of the crosslinkable compound composition. This is achieved by immediately, rapidly, and thoroughly (homogeneously) blending the injected curative additives in 20 to 60 seconds into the melt of the intermediate compound by continuing melt compounding thereof at the downstream end of or downstream of the melt compounding device. The method employs a melt compounding device, described later, that is capable of operating at the ultrahigh temperature from 150.1° to 180.0 °C and is capable of such rapid and thorough mixing in less than 60 seconds.

Devices that are not capable of the rapid and thorough blending in the mixing step are excluded from the method. Such excluded devices include rolling mills, rolling drums, ball mills, handheld mixers, and any other long residence time mixing/blending devices, such as batch mixers, that are inherently incapable of thoroughly melting the thermoplastic polyolefins and mixing all the constituents of the crosslinkable compound composition in less than 60 seconds as described herein.

Continuous processing and batch processing embodiments of the method. The method is adaptable to batch processing or continuous processing embodiments. As used herein, "batch processing" means embodiments of the method that intermittently make the crosslinkable compound composition at discreet, short intervals, e.g., with breaks in time every few minutes or every few hours, depending upon size of the equipment, and/or with a break in the flow of material through the production line such that intermediate materials and final products are made at discreet times and in discrete batches.

"Continuous processing" means embodiments of the method that constantly make the crosslinkable compound composition without any break in time or flow of materials through the production line such that final products are produced without interruption. In theory a continuous process can run forever but in practice it runs for 12 hours or longer, alternatively 24 hours or longer, alternatively 7 days or longer, and may be stopped infrequently, such as for cleaning equipment, when a supply of raw material is interrupted (e.g., due to shipping delays), or to change over equipment to make a different final product. Continuous embodiments make the crosslinkable compound composition in seconds as a continuous stream produced at production rate that beneficially, is sufficiently high (e.g., at least 10 kilograms of crosslinkable compound composition made per hour (kg/hour), alternatively at least 50 kg/hour, alternatively at least 100 kg/hour) for continuously feeding freshly made crosslinkable compound composition to a pelletizer device or to a cable coating device in a commercial cable production line. In some embodiments the method is a continuous process comprising continuous embodiments of the providing, injecting, and mixing steps.

Optional additional steps of the method. The method is not particularly limited in including additional steps with the proviso that any additional step would not negate the providing, injecting, and mixing steps.

Optional preliminary steps preceding the providing step. To make the intermediate compound in homogeneous form and in a continuous process, a primary feed of the thermoplastic polyolefin polymer and one or more antioxidants may be melt-compounded or melt-blended in a melt compounding device to make a primary stream of a melt of the intermediate compound. Typically in practice the method includes a step of melting the thermoplastic polyolefin polymer. But other embodiments that generate a melt of the thermoplastic polyolefin polymer directly (i.e., not from solids), such as a polymerization reaction that polymerizes olefin monomers in solution and/or at a temperature greater than the polymer's melting temperature, are also contemplated. In some embodiments the method comprises at least one of the following additional steps: before the providing step, a step of introducing through the one of the feed ports in the melting/compounding zone a solid form (e.g., pellets) of the intermediate compound into the melting/compounding zone and melting the introduced intermediate compound in the melting/compounding zone of the screw extruder. Alternatively before the providing step, a step of introducing through the one of the feed ports in the melting/compounding zone a solid form of the one or more thermoplastic polyolefins and introducing the one or more antioxidants into the melting/compounding zone and melting the one or more thermoplastic polyolefins in the melting/compounding zone of the screw extruder, and melt compounding the one or more antioxidants into the melt of the one or more thermoplastic polyolefins to make the melt of the intermediate compound. The melt of the one or more thermoplastic polyolefins or the melt of the intermediate compound may be melt screened before the providing step.

Optional steps following the mixing step. The method is not particularly limited in including additional steps with the proviso that any additional step would not negate the providing, injecting, and mixing steps. For example, the method does not permit any step that delays the mixing step beyond 60 seconds or that prevents the mixing step from achieving homogeneity of the mixture. In some embodiments the method does not include any step before the providing step, whereas in other embodiments the method comprises at least one additional step before the providing step, such as a step of making the melt of the intermediate compound. In some embodiments the method does not include any step after the mixing step, whereas in other embodiments the method comprises at least one additional step after the mixing step, such as a pelletizing step or coating step. In some embodiments the method does not comprise any step between the providing step and the injecting step, whereas in other embodiments the method includes at least one step between the providing step and the mixing step, such as the step of feeding the second polymer into the melt of the intermediate compound. The method does not include any step between the injecting step and the mixing step, but may include an additional step during the injecting step, such as injecting one or more non-curative additives at the same time as injecting the combination of curative additives.

In some embodiments the method comprises one or more additional steps after the mixing step that are adapted for making an insulation layer of an electrical power cable or telecommunications cable (generically an "insulated conductor"). Insulated conductors typically comprise a conductor covered by the insulation layer. The conductor may be solid or stranded (e.g., a bundle of wires). Some insulated electrical conductors may also contain one or more additional elements such as semiconducting layer(s) and/or a protective jacket (e.g., wound wire, tape, or sheath). Examples are coated metal wires and electrical power cables, including those for use in low voltage ("LV", >0 to <5 kilovolts (kV)), medium voltage ("MV", 5 to <69 kV), high voltage ("HV", 69 to 230 kV) and extra-high voltage ("EHV", >230 kV) power cables and their electricity-transmitting/distributing applications.

Melt screening and pressurizing steps. Any method step that employs a polymer melt is adaptable for melt screening and/or pressurizing. Devices useful for such melt screening and/or pressurizing are described below.

Melt compounding devices and optional devices of a production line.

The method may be successfully performed in any device capable of carrying out the providing, injecting, and mixing steps. An example of such a device is the melt compounding device described above. Some embodiments of the method may include one or more additional devices selected from the group consisting of: melt pumps, a melt screen (e.g., a filtration unit containing a melt screen), and a pelletizer device. In some embodiments the method may further include a coating device for coating the crosslinkable compound composition onto a wire or optical fiber, as in manufacturing power or telecommunications cables.

Suitable devices for making the intermediate compound and the homogeneous mixture of the crosslinkable compound composition may comprise distributive mixing devices or segments in an extruder, or high intensity mixer, such as mixing rotors, toothed mixing element (TME, ZME, etc.) and kneading blocks, like kneading blocks (forward, neutral, or reverse pumping), gear mixers, melt pumps, gear pumps, or blister elements, when coupled with downstream mixing elements. Such melt compounding devices may include, for example, co-rotating intermeshing twin-screw extruders (for example, the 30 millimeter (mm) inner diameter Coperion ZSK-30 model twin screw extruder, which is used later in the working examples CE1 and IE1 to IE4; or a 26 mm inner diameter Coperion ZSK-26 model twin screw extruder, which may be used in future working examples), counter-rotating, high intensity, non-intermeshing twin-rotor mixers (e.g., Farrel, FCM), or single-screw extruders fitted with appropriate mixing devices, e.g., Maddock mixing section (which includes a Maddock mixer device). A broader selection of compounding devices may be used where the inventive method comprises delivering the melt stream of the intermediate compound to a melt pump and melt screening the pressurized melt stream upstream of any injection point, i.e. place for injecting the combination of curative additives into the melt stream. In such a case, the melt compounding device may comprise any of the above listed compounders, a co-rotating intermeshing twin-screw extruder, or counter-rotating, high intensity, non-intermeshing twin-screw compounding mixer. Without sufficiently rapid and thorough curative incorporation into the melt by the means described, the resulting composition exhibited severe scorch or decomposition of the organic peroxide. For example, experiments on a comparative Banbury mixer discharging at a melt temperature of 155 °C and downstream addition of the combination of curative additives resulted in severe scorch rendering the compound unusable.

Pressure is required to push a melt through a screen in a screening step or through a die in a pelletizing step. Some melt compounding devices that may be used in aspects of the method generate sufficient pressure to do screening or pelletizing (i.e., they are "sufficient pressure generating"). Other melt compounding devices that may be used in aspects of the method do not generate sufficient pressure for screening and/or pelletizing (i.e., they generate insufficient pressure), in which aspects a melt pump or single screw extruder may also be used for generating the sufficient pressure. Thus, the melt compounding device may, but is not required to generate sufficient pressure for melt screening or pelletizing.

Examples of melt compounding devices that generate sufficient pressure for screening or pelletizing are single-screw extruders and some twin-screw extruders. Examples of melt compounding devices that do not generate sufficient pressure for screening or pelletizing, and thus are used in combination with a melt pump or single screw extruder, are some twin-screw extruders, co-rotating intermeshing twin screw extruder not configured for sufficient pressure generation for melt screening or pelletizing, and counter-rotating, high intensity, non-intermeshing twin-screw extruder (e.g., Farrel FCM and LCM, Kobe Steel LCM, Japan Steel Works (JSW) Continuous Intensive Mixer (CIM) or CIMP), or single-screw extruders fitted with appropriate mixing devices, e.g., Maddock mixing section.

A suitable production line comprises, moving from upstream to downstream in melt flow, at least one melt compounding device, and, further, comprises a distributive mixing element (i) in the melt-compounding device such as a gear mixer or gear mixing element, or (ii) as a melt pump located downstream of the melt compounding device, or (iii) both, and, still further, comprises a melt screening unit. The melt mixing equipment may further comprise a pelletizer or pelletizing die. The melt mixing equipment may comprise two melt pumps, one located upstream of the melt screen and the other located downstream of the melt screen.

Suitable melt screening devices for use in accordance with the present in the inventive method may include, for example, continuous screening or filtering technology, such as a continuous plate, rotating screen changer, slide plate screen changer, dual bolt or chamber screen changer or any candle, pleated candle, disk, cylinder, or flat plate filtering element with a woven or non-woven filter medium able to stop particles ranging in size from 25 μm to 500 μm, such as, for example, polymer gels.

Suitable melt pumps for use in the inventive method may include any known in the art, e.g. MAAG, Farrel-Pomini, gear mixers or appropriately modified to enhance mixing twin gear pressure generating melt pumps.

In an example of an extruder, a single screw or twin-screw extruder has a feeder, a melt screw section and downstream mixing section, such as a kneading block or gear mixer. The thermoplastic polyolefin polymer feed consisting of an LDPE and an antioxidant may be fed via the feeder at the upstream end of the extruder barrel; the curative additives can be injected at any of various injection sites upstream of the downstream mixing section.

Figure 2:
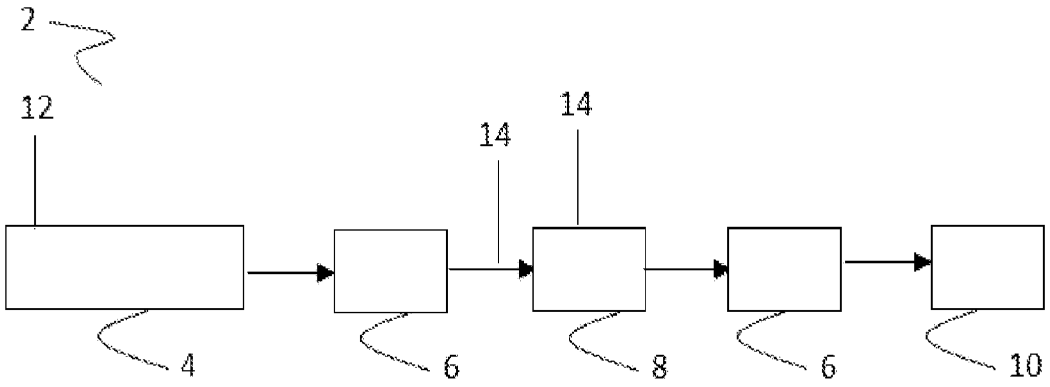
FIG. 2 depicts an alternative example of a melt compounding line (2) useful in the inventive method.
Figure 3:
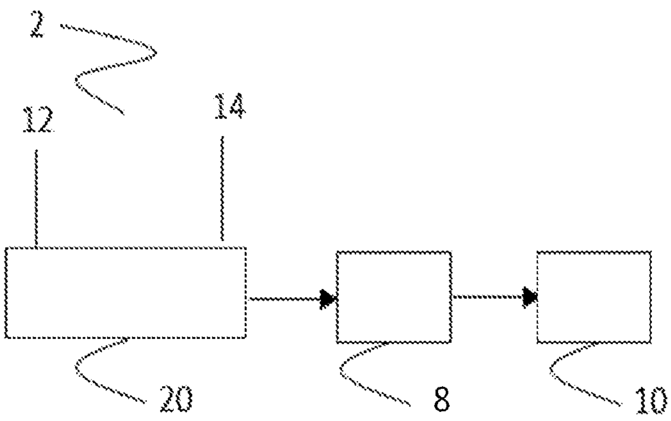
FIG. 3 depicts an example of a melt compounding line (2) used to make the crosslinkable compound compositions described later in the inventive Examples.

Detailed description of the drawings FIGS. 1, 2, and 3 illustrate versions of melt compounding devices and production lines that may be used in embodiments of the method. FIGS. 4, 5, and 6 illustrate process flow diagrams for embodiments of the method that feed to the melting/mixing zone of the melt compounding device (e.g., extruder) material (a) (FIG. 4), material (b) (FIG. 5), or material (c) (FIG. 6).

FIG. 1 depicts inventive methods and apparatuses for making conductor or cable insulation compositions. A melt compounding line (2) comprises, moving left to right from upstream to downstream, a melt compounding device (4), in this case a twin-screw extruder, a melt pump (6), a melt screen (8) and a pelletizing die (10). Melt compounding device (4) melts and mixes the base thermoplastic polyolefin (ethylene polymer) feed (12), including any antioxidant additives, and optionally including the combination of curative additives. Melt pump (6) helps build pressure upstream of the melt screen (8) which itself promotes the distribution of curative additives and improves the cleanliness of the crosslinkable compound product. Pelletizing die (10) pelletizes the formulation into a ready to use form. Melt compounding device (4) can be a twin-screw extruder, a counter-rotating twin-rotor mixer (e.g., Farrel, FCM), or a single-screw extruder. Along melt compounding line (2), curative additives can be injected at any injection site (14), including: i) into melt compounding device (4) at or above a distributive mixing section (not shown), ii) the transition between melt compounding device (4) and melt pump (6), or iii) into melt pump (6) directly, or a combination thereof. Multiple injection sites (14), each including part of the combination of curative additives could be used to inject the desired total amount of curative additive.

FIG. 2 depicts other inventive methods and apparatuses for making conductor or cable insulation compositions. A melt compounding line (2) comprises, moving left to right from upstream to downstream, a melt compounding device (4), in this case a twin-screw extruder, two melt pumps (6) straddling a melt screen (8) and a pelletizing die (10). Melt compounding device (4) melts and mixes the base thermoplastic polyolefin (ethylene polymer) feed (12), including antioxidant additives, and optionally, also including the combination of curative additives. The upstream (left hand) melt pump (6) helps build pressure upstream of the melt screen (8) which itself improves the cleanliness of the crosslinkable compound product. The downstream (right hand) melt pump (6) disperses the curative additives into the intermediate compound. Pelletizing die (10) pelletizes the formulation into a ready to use form. Melt compounding device (4) can be a co-rotating intermeshing twin-screw extruder, a counter-rotating twin-screw compounding mixer (e.g., Farrel, FCM), or a single-screw extruder. The curative additives can be injected into one or more injection sites (14), including i) the transition line between the melt screen (8) and downstream melt pump (6), or ii) directly into downstream melt pump (6). Both injection sites (14) may be used so that multiple injectors (not shown) may inject amounts that add up to the desired amount of curative additives.

FIG. 3 shows the experimental melt compounding line (2) used in the some of the Examples and comprises, moving left to right from upstream to downstream, extruder (20), polymer feed site (12), injection site (14) for the combination of curative additives, melt screen (8) and pelletizing die (10).

FIG. 4 illustrates a process flow diagram for embodiments of the method that feed to the melting/mixing zone of the melt compounding device (e.g., extruder) material (a). In FIG. 4, material (a) includes at least 1 thermoplastic polyolefin polymer ("TPO Polymer"), at least one antioxidant, at least one multialkenyl crosslinking coagent ("coagent"), but no peroxide. Material (a) is continuously fed into the melting and mixing zone of an extruder, whereupon the TPO Polymer is continuously rapidly melted as described earlier to give an initial melt. The initial melt is continuously conveyed into the ultrahigh temperature mixing zone ("Ultrahigh Temp. Mixing Zone"), where it continuously receives an injection of one or more organic peroxides. The one or more organic peroxides are rapidly and thoroughly mixed into the initial melt to make a melt of the crosslinkable compound composition, which is discharged from the melt compounding device. FIG. 4 contemplates discharging the crosslinkable compound composition to a post-compounding device (e.g., a pelletizer), which is not shown.

FIG. 5 illustrates a process flow diagram for embodiments of the method that feed to the melting/mixing zone of the melt compounding device (e.g., extruder) material (b). In FIG. 5, material (b) includes at least 1 thermoplastic polyolefin polymer ("TPO Polymer"), at least one antioxidant, at least one multialkenyl crosslinking coagent ("coagent"), and at least one organic peroxide. Material (b) is continuously fed into the melting and mixing zone of an extruder, whereupon the TPO Polymer is continuously rapidly melted as described earlier to give an initial melt. The initial melt is continuously conveyed into the ultrahigh temperature mixing zone ("Ultrahigh Temp. Mixing Zone"), where either it does not receive an injection of any curative additive or it continuously receives an injection of at least one additional organic peroxide, at least one additional multialkenyl crosslinking coagent, or both. Any injected additional organic peroxide(s) and/or coagent(s) are rapidly and thoroughly mixed into the initial melt to make a melt of the crosslinkable compound composition, which is discharged from the melt compounding device. FIG. 5 contemplates discharging the crosslinkable compound composition to a post-compounding device (e.g., a pelletizer), which is not shown.

FIG. 6 illustrates a process flow diagram for embodiments of the method that feed to the melting/mixing zone of the melt compounding device (e.g., extruder) material (c). In FIG. 6, material (c) includes at least 1 thermoplastic polyolefin polymer ("TPO Polymer") and at least one antioxidant, but does not include any multialkenyl crosslinking coagent ("coagent") or peroxide. Material (c) is continuously fed into the melting and mixing zone of an extruder, whereupon the TPO Polymer is continuously rapidly melted as described earlier to give an initial melt. The initial melt is continuously conveyed into the ultrahigh temperature mixing zone ("Ultrahigh Temp. Mixing Zone"), where it continuously receives an injection of curative additives comprising one or more multialkenyl crosslinking coagents and one or more organic peroxides. The curative additives may be injected as a premixture thereof or injected individually and separately. The injected curative additives are rapidly and thoroughly mixed into the initial melt to make a melt of the crosslinkable compound composition, which is discharged from the melt compounding device. FIG. 6 contemplates discharging the crosslinkable compound composition to a post-compounding device (e.g., a pelletizer), which is not shown.

Extruded articles. The crosslinkable compound composition made by the method may be extruded into manufactured articles. These extruded articles include pellets, coatings, films, laminates, pipes, conduits, and the like comprising the crosslinkable compound composition. The extruded article may comprise any polyolefin-based layer of a coated conductor, including a semiconductive layer (comprising carbon black), an insulation layer, or both. Extruded articles may experience elevated temperatures when in use, such as for example due to heating that would be experienced by an insulation layer during operation of an MV, HV, or EHV electrical power cable.

Crosslinkable compound composition. The crosslinkable compound composition is inventive by virtue of how it is made by the inventive method, which may result in an inherent difference in at least one property than that of an otherwise identical comparative compound composition made from the same constituents in the same amounts but by any passive method of incorporating the one or more organic peroxides into a thermoplastic polyolefin. Examples of such passive methods are soaking are imbibing. In some embodiments the passive method cannot achieve the inventive property.

For example, the thermal history of the inventive crosslinkable compound composition differs from the thermal history of the comparative compound composition by virtue of the different methods of making same. Thus as a result of the different thermal histories, the inventive crosslinkable compound composition may differ from the comparative compound composition in at least one aspect selected from the group consisting of: proportions of constituents; concentrations of constituents; melt rheology properties; and mechanical properties.

The crosslinkable compound composition is storage stable. This enables separate in-line article fabrication at a later time, i.e. separate extruding and shaping into a manufactured article, such as cable insulation. batch stable or even crosslinkable after melt compounding.

The crosslinkable compound composition is resistant to scorch and has excellent curability. In some embodiments the method and composition made thereby has any one of limitations (i) to (iii): (i) a time to scorch (scorch time) ts1 at 140 °C of at least 95 minutes; (ii) a minimum torque (ML) at 182 °C of from 0.10 to 0.14 deciNewton-meter (dN-m); or (iii) a combination of limitations (i) and (ii). In some embodiments the crosslinkable compound composition has a scorch time (ts1) at 140 °C of at least 63 minutes, alternatively at least 79 minutes, reported as the time required at 140 °C for an increase of 1 poundforce-inch (Ibf-in) or 1.13 deciNewton-meter (dN-m) from minimum torque ("ML"), as determined by moving die rheometer (MDR) testing in accordance with ASTM procedure D5289; and the crosslinkable compound composition has a maximum torque (MH) at 182 °C that is at least 1.67 deciNewton-meter (dN-m; equal to at least 1.48 lbf-in) higher than minimum torque (ML) at 182 °C, alternatively MH is at least 1.72 dN-m higher (at least 1.52 lbf-in higher) than ML at 182 °C and MH at 182 °C is at least 1.79 dN-m (1.58 lbf-in), alternatively at least 1.83 dN-m (1.62 lbf-in), as determined by moving die rheometer (MDR) testing in accordance with ASTM procedure D5289. If the scorch time (ts1) of the crosslinkable compound composition is too low (i.e., less than 63 minutes), then the crosslinkable compound composition may have experienced too much scorch and may not be of sufficient quality for making extruded articles. The longer the measurement of scorch time (ts1) goes past 63 minutes, the less premature crosslinking of the crosslinkable compound composition. If the MH at 182 °C of the crosslinkable compound composition is too low (i.e., less than 1.6 dN-m), then the crosslinkable compound composition may not be curable or may have defects such as gels. If the MH at 182 °C of the crosslinkable compound composition is too high (i.e., greater than 4 dN-m), then the crosslinkable compound composition may take too long to fully cure.

The crosslinkable compound composition has excellent extrudability as shown by its rheological properties. In some embodiments the method and composition made thereby has any one of limitations (i) to (iii): (i) melt index $I_{10}$ at 120 °C, 10.0 kg of from 4.0 to 5.7 g/10 minutes; (ii) a viscosity at 135 °C under a shear rate of 0.1 radian per second (rad/sec) of 1.7 to 2.7 kilopascal-seconds (kPa-sec) (1,700 to 2,700 Pa-sec); or (iii) a combination of limitations (i) and (ii). If the $I_{10}$ at 120 °C or viscosity at 135 °C/0.1 rad/sec. of the crosslinkable compound composition is too low (i.e., less than 4 g/10 minutes or less than 1.7 kPa-sec, respectively), then the crosslinkable compound composition may not have sufficient melt extrudability resulting in defects in the extruded article such as cracks, voids, or gels. If the $I_{10}$ at 120 °C or viscosity at 135 °C/0.1 rad/sec. of the crosslinkable compound composition is too high (i.e., less than 6 g/10 minutes or greater than 2.7 kPa-sec, respectively) then the extruded article made from a crosslinked product thereof may not have sufficient creep resistance when exposed to heat. In some embodiments the crosslinkable compound composition has a viscosity at 135 °C/0.1 rad/sec. of from 2.05 to 2.65 kPa-sec.

The crosslinkable compound composition has excellent mechanical properties as shown by at least one of its tensile strength, resistance to elongation, and resistance to hot creep. In some embodiments the method and composition made thereby has any one of limitations (i) to (v): (i) a tensile strength of greater than 17.20 megapascals (MPa); (ii) an elongation at break of greater than 500.0%; (iii) a combination of limitations (i) and (ii); (iv) a hot creep at 200 °C of less than 80.0%; or (v) a combination of limitation (iv) and any one of limitations (i) to (iii). If the tensile strength and/or elongation at break is too low, then an extruded article made from a crosslinked product thereof may have insufficient mechanical strength for its intended use. If the tensile strength and/or elongation at break is too high, then an extruded article made from a crosslinked product thereof may break prematurely during use. If the hot creep at 200 °C of the crosslinkable compound composition is too high (i.e., greater than 80%) then the extruded article made from a crosslinked product thereof may not have sufficient creep resistance when exposed to heat.

The intermediate compound and the melt of thereof, including the primary stream.

The intermediate compound is adapted for use in the method. For example, the one or more thermoplastic polyolefins (TPOs) are chosen to have an overall starting melt index value ($I_2$) that is sufficiently high such that after the mixing step, even if the crosslinkable compound composition has undergone minimal premature crosslinking (scorch) it has a melt rheology that enables subsequent extrusion of the composition into extruded articles. For example, in some embodiments the one or more thermoplastic polyolefins has an overall melt index ($I_2$) of from 1 to 20 g/10 minutes, alternatively 2 to 10 g/10 minutes, alternatively 3 to 10 g/10 minutes, alternatively 3 to 5 g/10 minutes, as determined in accordance with ASTM D1238 at 190 °C and 2.16 kg. If the overall $I_2$ of the one or more TPOs is too low (i.e., less than 1 g/10 minutes), then after minimal scorch the crosslinkable compound composition may not have sufficient melt extrudability resulting in defects in the extruded article such as cracks, voids, or gels. If the overall $I_2$ of the one or more TPOs is too high (i.e., greater than 20 g/10 minutes), then the extruded article made from a crosslinked product thereof may not have sufficient creep resistance when exposed to heat.

The intermediate compound may be made by any process or sequence of steps and as far as the method is concerned it does not particularly matter how the intermediate compound has been made. In some embodiments of the method, such as is described above, before the providing step: (a1) feeding one or more antioxidants and the one or more thermoplastic polyolefins into the melting/compounding zone via the one or more feed ports to make a primary stream comprising the one or more antioxidants and the one or more thermoplastic polyolefins (collectively constituents of the primary stream) but lacking the peroxides and multialkenyl crosslinking coagents and any added solids of a second polymer; (a2) melt compounding in the melting/compounding zone the primary stream at a temperature of from 155° to 174 °C to make the melt of the intermediate compound; (a3) cooling the melt of the intermediate compound to produce the intermediate compound in solid form, e.g., as pellets; and (a4) feeding the solid form of the intermediate compound into the melting/compounding zone of the screw extruder.

In some embodiments using the melt compounding device described above, the melt of the one or more thermoplastic polyolefins and the one or more antioxidants, but lacking the peroxides and multialkenyl crosslinking coagents and any added solids of a second polymer, is referred to herein as a "primary stream". The primary stream comprising the one or more antioxidants and the one or more thermoplastic polyolefins (collectively constituents of the primary stream) but lacking one or more curative additives selected from the group consisting of: organic peroxides and multialkenyl crosslinking coagents, and the melt stream of an intermediate compound made therefrom (the intermediate compound comprising a mixture of: the one or more thermoplastic polyolefin polymers, and the one or more antioxidants (AO), but lacking the one or more curative additives) is free of any other polymer. In such embodiments the polymer constituent(s) of the primary stream and the intermediate compound made therefrom consist of one or more of the thermoplastic polyolefins. In such embodiments the polymer constituent(s) of the crosslinkable compound composition made by the inventive method consist of the one or more of the thermoplastic polyolefins and the polymer constituent(s) of the crosslinked compound composition made by curing the crosslinkable compound composition independently consist of the one or more thermoplastic polyolefins and/or crosslinked polyolefins made by curing same.

In some embodiments, the primary stream comprising the one or more antioxidants and the one or more thermoplastic polyolefins (collectively constituents of the primary stream) but lacking one or more curative additives selected from the group consisting of: organic peroxides and multialkenyl crosslinking coagents, and the melt stream of an intermediate compound made therefrom (the intermediate compound comprising a mixture of: the one or more thermoplastic polyolefin polymers, and the one or more antioxidants (AO), but lacking the one or more curative additives) also contains a polyolefin that is the above-described non-thermoplastic polymer. In such embodiments the polymer constituent(s) of the primary stream and the intermediate compound made therefrom consist of one or more of the thermoplastic polyolefins and one or more ethylene/unsaturated carboxylic ester copolymers. The proportion of the one or more ethylene/unsaturated carboxylic ester copolymer(s) used in such embodiments of the primary stream may be from 0.05 wt % to 20 wt %, alternatively from 0.10 to 15 wt %, alternatively from 0.10 to 5 wt %, based on total weight of the primary stream and the proportion of the one or more ethylene/unsaturated carboxylic ester copolymer(s) used in such embodiments of the intermediate compound independently may be from 0.05 wt % to 20 wt %, alternatively from 0.10 to 15 wt %, alternatively from 0.10 to 5 wt %, based on total weight of the intermediate compound. Embodiments of the crosslinkable compound composition made therefrom according to the inventive method also contain the one or more ethylene/unsaturated carboxylic ester copolymer(s) and the crosslinked compound composition made by curing such embodiments contain crosslinked products thereof.

Thermoplastic polyolefin (TPO). The crosslinkable compound composition comprises a thermoplastic polyolefin ("TPO"). The terms "thermoplastic polyolefin" and "TPO" are used herein to refer to homopolymers made by polymerizing a single unsaturated hydrocarbon monomer and copolymers made by polymerizing two or more different unsaturated hydrocarbon monomers, wherein each unsaturated hydrocarbon monomer consists of carbon atoms and hydrogen atoms.

In some embodiments the thermoplastic polyolefin is an ethylene-based polymer. An ethylene-based polymer comprises from 51 to 100 wt % of ethylenic units derived from polymerizing ethylene and from 49 to 0 wt % of comonomeric units derived from polymerizing one, alternatively two olefin-functional monomers (a monomer and a comonomer). The comonomer may be selected from propylene, a ($C_4$-$C_{20}$) alpha-olefin, and 1,3-butadiene. The ($C_4$-$C_{20}$) alpha-olefin may be a ($C_4$-$C_8$) alpha-olefin such as 1-butene, 1-hexene, or 1-octene.

The ethylene-based polymer embodiment of the TPO may be selected from the group consisting of polyethylene homopolymers, ethylene/propylene copolymers, and ethylene/($C_4$-$C_{20}$) alpha-olefin copolymers. Examples of unsaturated hydrocarbon monomers are ethylene; propylene; ($C_4$-$C_{20}$) alpha-olefins; and 1,3-butadiene. In some embodiments the TPO is a polyethylene homopolymer or an ethylene/($C_4$-$C_{20}$) alpha-olefin copolymer. The ($C_4$-$C_{20}$) alpha-olefin is a compound of formula $H_2C{=}C(H){-}(CH_2)_qCH_3$, wherein subscript q is an integer from 1 to 17. In some embodiments the ($C_4$-$C_{20}$) alpha-olefin is 1-butene, 1-hexene, or 1-octene; alternatively 1-butene or 1-hexene; alternatively 1-octene; alternatively 1-hexene; alternatively 1-butene.

If a blend of ethylene polymers is employed, the polymers can be blended by any in-reactor or post-reactor process.

The ethylene polymer can be selected from the group consisting of low-density polyethylene ("LDPE"), linear-low-density polyethylene ("LLDPE"), very-low-density polyethylene ("VLDPE"), and combinations of two or more thereof. LDPEs are generally highly branched ethylene homopolymers, and can be prepared via high pressure processes (i.e., HP-LDPE).

Suitable LDPEs may have a density ranging from 0.91 to 0.94 g/cm$^3$ or, for example, at least 0.915 g/cm$^3$ but less than 0.94, or less than 0.93 g/cm$^3$. Polymer densities provided herein are determined in accordance with ASTM method D792. LDPEs suitable for use herein can have a melt index ($I_2$) of from 1 to 20 g/10 minutes, alternatively 2 to 10 g/10 minutes, alternatively 3 to 10 g/10 minutes, alternatively 3 to 5 g/10 minutes, determined according to ASTM method D1238 at 190 °C and 2.16 kg.

Suitable LLDPEs may have a heterogeneous distribution of comonomers (e.g., α-olefin monomer), and characterized by short-chain branching. For example, LLDPEs can be copolymers of ethylene and α-olefin monomers having a density ranging 0.916 to 0.925 g/cm$^3$. LLDPEs suitable for use herein can have a same melt index ($I_2$) as for LDPEs.

VLDPEs and ULDPEs suitable for use as the TPO may have a heterogeneous distribution of comonomer (e.g., α-olefin monomer), and characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index ($I_2$) as for the LDPEs.

The total weight of the one or more thermoplastic polyolefins in the intermediate compound and/or crosslinkable compound composition may be from 50 to 99.79 wt %, alternatively from 80.0 to 99.79 wt %, alternatively from 95 to 99 wt %, e.g., 98.0 to 98.9 wt %, all weights based on the total weight of the intermediated compound or crosslinkable compound composition, respectively. Any wt % not attributable to the one or more thermoplastic polyolefins, the one or more antioxidants, and the curative additives is attributable to one or more non-curative additives described later and/or the second polymer described herein.

The thermoplastic polyolefins may be made by methods known in the art. Any conventional or hereafter discovered production process for producing suitable ethylene polymers may be employed for preparing the ethylene-based polymer embodiments of the thermoplastic polyolefin. In general, polymerization can be accomplished at conditions known in the art for Ziegler-Natta or Kaminsky-Sinn polymerization reactions, that is, at temperatures from 0 to 250 °C, or from 30 or 200 °C, and at pressures from 100 to 10,000 atmospheres (1,013 megaPascals ("MPa")) alternatively from 500 to 10,000 atmospheres. In most polymerization reactions, the molar ratio of polymerization catalyst to monomers ranges from 10-12:1 to 10-1:1, or from 10-9:1 to 10-5:1.

Polyolefins that are not thermoplastic are not included as embodiments of the one or more thermoplastic polyolefins, but may be included in certain embodiments of the intermediate compound and crosslinkable compound compositions made therefrom as an additional component that is a non-thermoplastic polymer. Examples of such non-thermoplastic polymers are ethylene/unsaturated carboxylic ester copolymers. Examples of ethylene/unsaturated carboxylic ester copolymers that may be used are ethylene/alkyl acrylate (EAA) copolymers, ethylene/alkyl methacrylate (EAMA) copolymers, and ethylene/vinyl acetate (EVA) copolymers. Examples of ethylene/alkyl acrylate copolymers are ethylene/methyl acrylate (EMA) copolymers, ethylene/ethyl acrylate (EEA) copolymers, and ethylene/butyl acrylate (EBA) copolymers. Examples of ethylene/alkyl methacrylate copolymers are ethylene/methyl methacrylate (EMMA) copolymers, ethylene/ethyl methacrylate (EEMA) copolymers, and ethylene/butyl methacrylate (EBMA) copolymers. These polymers may be used as the second polymer in embodiments that include the same.

Antioxidants. The intermediate compound contains one or more antioxidants. Suitable antioxidants (AO) may comprise tertiary amines, secondary or tertiary thiols, secondary or tertiary phenols, bisphenols, trisphenols and tetraphenols, alternatively combinations of two or more of these. Examples of suitable antioxidants may include, for example, (4-(1-methyl-1-phenylethyl)phenyl) amine (e.g., NAUGARD 445, Addivant USA, Danbury, CT); 2,2-methylene-bis(4-methyl-6-t-butyl phenol) (e.g., VANOX MBPC, Vanderbilt Chemicals, New York, NY); 2,2-thiobis(2-t-butyl-5methyl) phenol (CAS No. 90-66-4); 4,4'-thiobis(2-t-butyl-5 methylphenol) also known as 4,4'-thiobis(6-tert-butyl-m-cresol), CAS No. 96-69-5, LOWINOX TBM 6 antioxidant, Addivant); 2,2'-thiobis(6-t-butyl-4-methylphenol) (CAS No. 90-66-4, commercially LOWINOX TBP-6); tris[(4-tert-butyl-3-hydroxy-2,6-dimethylphenyl)methyl)-1, 3,5-triazine-2,4,6 trione (e.g., CYANOX 1790 antioxidant, Solvay Chemicals, Syracuse, NY); pentaerythritol tetrakis (3-(3,5-bis(1,1-dimethylethyl)-4-hydroxyphenyl) propionate (e.g., IRGANOX 1010 antioxidant, CAS Number 6683-19-8); 3,5-bis(1,1dimethylethyl)-4-hydroxybenzenepropanoic acid 2,2'-thiodiethanediyl ester (e.g., IRGANOX 1035 antioxidant, CAS Number 41484-35-9, BASF, Ludwigshafen, DE); distearyl thiodipropionate (DSTDP); dilauryl thiodipropionate (e.g., IRGANOX PS 800 antioxidant); stearyl 3-(3,5-di-t-butyl-4-hydroxyphenyl) propionate (e.g., IRGANOX 1076); 2,4-bis(dodecylthiomethyl)-6-methylphenol (IRGANOX 1726 antioxidant); 4,6-bis(octylthiomethyl)-o-cresol (e.g. IRGANOX 1520 antioxidant); and 2,3-bis[3-[3,5-di-tert-butyl-4-hydroxyphenyl] propionyl]propionohydrazide (IRGANOX 1024 antioxidant). In some embodiments the one or more antioxidants comprises 4,4'-thiobis(2-t-butyl-5-methylphenol, also known as 4,4-thiobis(6-tert-butyl-m-cresol); 2,2'-thiobis(6-t-butyl-4-methylphenol); tris[(4-tert-butyl-3-hydroxy-2,6-dimethylphenyl)methyl]-1,3,5-triazine-2,4,6 trione; distearyl thiodipropionate or dilauryl thiodipropionate (e.g., Cyanox 2212); or a combination of any two or more thereof. In some embodiments the antioxidant may be a combination of tris[(4-tert-butyl-3-hydroxy-2,6-dimethylphenyl)methyl)-1,3,5-triazine-2,4,6-trione and distearyl thiodipropionate. The total amount of the one or more antioxidants may be from 0.01 to 5 wt. %, or, from 0.05 to 3 wt. %, or, from 0.10 to 0.30 wt. %, all weights based on the total weight of the intermediated compound or crosslinkable compound composition, respectively.

Organic peroxides. The curative additives comprise the one or more organic peroxides. As used herein the organic peroxide is a molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms, or collection of such molecules. The curative additives may comprise one or more organic peroxides that independently may be a monoperoxide of formula $R^O$—O—O—$R^O$, wherein each $R^O$ independently is a $(C_1\text{-}C_{20})$alkyl group or $(C_6\text{-}C_{20})$ aryl group. Each $(C_1\text{-}C_{20})$ alkyl group independently is unsubstituted or substituted with 1 or 2 $(C_6\text{-}C_{12})$ aryl groups. Each $(C_6\text{-}C_{20})$ aryl group is unsubstituted or substituted with 1 to 4 $(C_1\text{-}C_{10})$alkyl groups. Alternatively, the curative additives may comprise one or more organic peroxides that independently may be a diperoxide of formula $R^O$—O—O—R—O—O—$R^O$, wherein R is a divalent hydrocarbon group such as a $(C_2\text{-}C_{10})$alkylene, $(C_3\text{-}C_{10})$ cycloalkylene, or phenylene, and each $R^O$ is as defined above. Alternatively the curative additives may comprise one or more of the monoperoxides and one or more of the diperoxides. Example of suitable organic peroxides are bis(1,1-dimethylethyl) peroxide; bis (1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl)benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. In some embodiments the organic peroxide includes or consists of dicumyl peroxide. In some aspects a blend of two or more organic peroxides is used, e.g., a 20:80 (wt/wt) blend of t-butyl cumyl peroxide and bis(t-butyl peroxy isopropyl)benzene (e.g., LUPEROX D446B, which is commercially available from Arkema). The total amount of the one or more organic peroxides may be from 0.1 to 5 wt. %, or, from 0.2 to 3 wt. %, or, from 0.3 to 0.8 wt. %, all weights based on the total weight of the intermediated compound or crosslinkable compound composition, respectively.

Multialkenyl crosslinking coagents. The curative additives comprise the one or more multialkenyl crosslinking coagents. Suitable multialkenyl crosslinking coagents may comprise, for example, a monocyclic organosiloxane of formula (I): $[R^1,R^2SiO_{2/2}]_n$ (I), wherein subscript n is an integer greater than or equal to 3; each $R^1$ is independently a $(C_2\text{-}C_4)$alkenyl or a $H_2C{=}C(R^{1a})$—C(=O)—O—$(CH_2)_m$—, wherein $R^{1a}$ is H or methyl and subscript, and m is an integer from 1 to 4; and each $R^2$ is independently H, $(C_1\text{-}C_4)$alkyl, phenyl, or is the same as $R^1$. Suitable multialkenyl crosslinking coagents of formula (I) include, for example, 2,4,6-trimethyl-2,4,6-trivinyl-cyclotrisiloxane ("Vinyl-D3"), 2,4,6,8-tetramethyl-2,4,6,8-tetravinyl-cyclotetrasiloxane ("Vinyl-D4"), 2,4,6,8,10-pentamethyl-2,4,6,8,10-pentavinyl-cydopentasiloxane ("Vinyl-D5"), and mixtures thereof. Other suitable multialkenyl crosslinking coagents may comprise di-functional and higher functional monomers capable of copolymerizing with an ethylene polymer, such as a multiallyl or multivinyl crosslinking coagent. As used herein, "multiallyl" denotes a compound having at least two pendant allyl functional groups, for example, a triallyl compound selected from the group consisting of triallyl isocyanurate ("TAlC"), triallyl cyanurate ("TAC"), triallyl trimellitate ("TATM"), and mixtures of two or more thereof. Examples of suitable multialkenyl crosslinking coagents include multiallyl crosslinking coagents, such as triallyl isocyanurate ("TAlC"), triallyl cyanurate ("TAC"), triallyl trimellitate ("TATM"), triallyl orthoformate, pentaerythritol triallyl ether, triallyl citrate, and triallyl aconitate; multiacrylic crosslinking coagents, such as ethoxylated bisphenol A dimethacrylate; trimethylolpropane triacrylate ("TMPTA"), trimethylolpropane trimethylacrylate ("TMPTMA"), 1,6-hexanediol diacrylate, pentaerythritol tetraacrylate, dipentaerythritol pentaacrylate, tris(2-hydroxyethyl) isocyanurate triacrylate, and propoxylated glyceryl triacrylate; polybutadiene having a high 1,2-vinyl content, and trivinyl cyclohexane ("TVCH"); and other multialkenyl crosslinking coagents as described in U.S. Pat. Nos. 5,346,961 and 4,018,852. Still other multialkenyl crosslinking coagents may have at least one N,N-diallylamide functional group such as is disclosed in U.S. Pat. No. 10,941,278 B2 to Cai et al. The multialkenyl crosslinking coagent may be TAlC. Additional examples of multialkenyl crosslinking coagents are described in U.S. Pat. No. 6,277,925 (e.g., allyl 2-allyl-phenyl ether, and the like) and U.S. Pat. No. 6,143,822 (e.g., 1,1-diphenylethylene, which may be unsubstituted or substituted).

The multialkenyl crosslinking coagent may be a blend of two or more such coagents. In some embodiments the multialkenyl crosslinking coagent is a blend of a monocyclic organosiloxane of formula (I) and a multiallyl crosslinking coagent. In some embodiments the multialkenyl crosslinking coagent is a blend of 2,4,6,8-tetramethyl-2,4,6,8-tetravinyl-cyclotetrasiloxane (Vinyl-D4) and triallyl isocyanurate (TAlC).

The amount of the one or more multialkenyl crosslinking coagents in the intermediate compound and/or the crosslinkable compound composition may be from 0.1 to 10 wt. %, alternatively from 0.3 to 5 wt. %, alternatively from 0.6 to 3 wt. %, alternatively from 1.1 to 2.4 wt. %, all weights based on the total weight of the intermediated compound or crosslinkable compound composition, respectively.

In some embodiments the combination of curative additives comprises one organic peroxide and one or two multialkenyl crosslinking coagents. In some embodiments the method uses, and the crosslinkable compound composition comprises: a low-density polyethylene (LDPE); at least one antioxidant selected from distearyl thiodipropionate and dilauryl thiodipropionate; at least one organic peroxide selected from dicumyl peroxide; and at least one multialkenyl crosslinking coagent selected from 2,4,6,8-tetramethyl-2,4,6,8-tetravinyl-cyclotetrasiloxane (Vinyl-D4) and triallyl isocyanurate (TAlC).

Optional non-curative additives. In some embodiments the intermediate compound and the crosslinkable compound composition contains one or more additional non-curative additive besides the one or more antioxidants. The one or more additional non-curative additives may be additives known for use in an insulation layer of an electrical power cable or telecommunications cable. Examples of such one or more additional non-curative additive are a hindered amine stabilizer (HAS) such as a hindered amine light stabilizer (HALS), an inorganic filler; a flame retardant; a treeing retardant; a methyl radical scavenger; a processing aid; a colorant; a slip agent; a plasticizer; a surfactant; an extender oil; a scavenger; a metal deactivator; or a combination of any two or more thereof.

Any compound, composition, formulation, material, mixture, or reaction product herein may be free of any one of the chemical elements selected from the group consisting of: Li, Be, B, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements that are inherently required thereby are not omitted.

Alternatively precedes a distinct embodiment. ANSI is the American National Standards Institute organization headquartered in Washington, D.C., USA. ASME is the American Society of Mechanical Engineers, headquartered in New York City, New York, USA. ASTM is the standards organization, ASTM International, West Conshohocken, Pennsylvania, USA. Any comparative example is used for illustration purposes only and shall not be prior art. Free of or lacks means a complete absence of; alternatively not detectable. IEC is International Electrotechnical Commission, 3 rue de Varemb, Case postale 131, CH-1211, Geneva 20, Switzerland, http://www.iec.ch. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23°±1 °C.

Unless stated otherwise, definitions of terms used herein are taken from the IUPAC Compendium of Chemical Technology ("Gold Book") version 2.3.3 dated Feb. 24, 2014.

Any one or more of the open-ended terms "comprising" or "comprises" may be replaced by the partially closed-ended phrase "consisting essentially of" or "consists essentially of" or by the closed-ended phrases "consisting of" or "consists of". The phrases "consisting essentially of" and "consists essentially of" as used herein mean that the method, intermediate compound, and crosslinkable compound composition are free of any excluded elements and steps. Examples of the excluded steps are passively adding curative additives into the intermediate compound and cooling the melt of the intermediate compound below 150 °C right before the injecting step In some embodiments, non-continuous production methods are excluded. The excluded elements include excluded devices such as soaking towers or excluded mixing devices and any excluded additives such as may be found in accidentally anticipating the prior art. The phrases "consisting of" and "consists of" are closed-ended and exclude any element or feature that is not explicitly listed thereafter. Use of the term "comprises" or "comprising" in referring to a material or feature that follows does not negative the partially closed ended nature of the "consisting essentially of" or "consists essentially of" or the closed ended nature of "consisting of" or "consists of", but merely allows any additional element or step that is not explicitly excluded by the "consisting essentially of" or "consists essentially of. A prophetic example is an inventive embodiment that has not been actually made, but is contemplated by the inventors to work according to the invention.

Contemplated herein is any range formed by combining a preferred lower limit with any upper limit or by combining a preferred upper limit with any lower limit or by combining a measured value from any one of the inventive examples with any lower or upper limit.

Preparation of Cured Plaques: pressed and cured pellets using a WABASH™ GENESIS™ Steam Press with quench cooling capability. For comparative compound compositions soaked pellets were pressed and cured under pressure using a WABASH™ GENESIS™ Steam Press (Wabash MPI, Wabash, IN) with quench cooling capability. The plaques were then subject to the indicated testing. Curing for the hot creep test comprised melting pellets at 120 °C in compression molds WABASH™ GENESIS™ Steam Press; the dimension of the mold is 203 mm by 203 mm (8 inch by 8 inch) by 1.3 mm (50 mil) under a low pressure of 3.5 MPa (500 psi) for 3 minutes, and then compressing at the same temperature under a high pressure of 17 MPa (2500 psi) for another 3 minutes; opening the molds, removing the plaque from the mold, and cutting it into four similar size pieces. In the test, the four pieces were then rearranged, put back into the mold, melted at 120 °C under a low pressure of 3.5 MPa (500 psi) for 3 minutes and compressed at the same temperature under a high pressure of 17 MPa (2500 psi) for another 3 minutes; then the temperature of the press increased to 182 °C and held for 12 minutes to cure the samples under the high pressure. After curing, the molds were cooled down to room temperature at 15 °C/minutes under the high pressure.

Preparation of Uncured Plaques: pressed soaked pellets using the Wabash™ GENESIS™ Steam Press with quench cooling capability. For the below-described Moving Die Rheometer Test Method, the pellets were first melted at 120 °C under a low pressure of 3.5 MPa (500 psi) for 3 minutes and compressed at the same temperature under a high pressure of 17 MPa (2500 psi) for another 3 minutes. The molds were cooled down to room temperature at 15 °C/minute under the high pressure to form the uncured plaque.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Units are grams per cubic centimeter (g/cm$^3$).

Melt index ($I_2$) Test Method: $I_2$ is measured according to ASTM D1238-04 (190 °C, 2.16 kg), *Standard Test Method for Melt Flow Rates of Thermoplastics by Extrusion Platometer*, using conditions of 190 °C/2.16 kilograms (kg). Units are grams eluted per 10 minutes (g/10 min.) or the equivalent in decigrams per 1.0 minute (dg/1 min.), wherein 10.0 dg=1.00 g.

Melt index ($I_{10}$) Test Method: $I_{10}$ is measured according to ASTM D1238-04 (120 °C, 10.0 kg), *Standard Test Method for Melt Flow Rates of Thermoplastics by Extrusion Platometer*, using conditions of 120 °C/10.0 kilograms (kg). Units are g/10 min. or the equivalent in dg/1 min., wherein 10.0 dg=1.00 g.

Stability Test Method: Samples of each crosslinkable compound composition being made by the inventive method were collected under the same processing conditions and collected at different time intervals after starting the injecting of the curative additives into the melt stream of the intermediate compound, and tested to demonstrate product and process stability as shown by consistency of product properties produced over a long continuous melt compounding run. To demonstrate the ability of the inventive method to be operated as a continuous, high product output process, experiments were conducted as long continuous melt compounding runs that lasted from 2 to 4 hours.

Hot Creep Test Method: Hot creep measures the cure performance or extent of crosslinking of a crosslinkable compound; it can also indicate the extent to which a compound has not yet been crosslinked. Hot creep refers to elongation deformation under load, of a cured specimen of a given crosslinkable compound and is measured in accordance with ICEA T-28-562. The hot creep test is performed at 200 °C with a 20 N/cm$^2$ weight attached to the lower end of a 1.3 mm (50 mil) dog bone sample cut from a cured plaque with a die cutter in accordance with ASTM D412 type D and marked with two benchmark lines, each line at a distance of 25.4 mm in the middle of the sample. The samples were put into a preheated oven at 200 °C with a weight equal to a force of 20 N/cm$^2$ attached to the bottom of each sample. After 15 minutes, the elongation (distance between benchmark lines) was measured and used to calculate the hot creep. The weights were removed from the samples. After 5 minutes in the oven, the samples were taken out and left at room temperature for 24 hours. The elongation (distance between benchmark lines) was measured again and this value was used to calculate the hot set. Three samples were tested and the averages of hot creep were reported. An acceptable Hot Creep result is 100% or lower. For Hot Creep, the lower % elongation, the more the material has been crosslinked.

Moving Die Rheometer (MDR) Test Method: A Moving Die Rheometer (MDR) enables measuring the cure properties of a crosslinkable compound. The instrument measures the torque response of the material under deformation. As the material undergoes crosslinking, the torque response increases and eventually reaches a maximum torque ("MH") after the peroxide has been reacted at the test conditions of time and temperature. The MH value indicates the crosslink level of a given compound and should high enough to produce a crosslinkable compound. MDR testing was performed in accordance with ASTM procedure D5289, "Standard Test 20 Method for Rubber-Property Vulcanization Using Rotorless Cure Meters", using an Alpha Technologies Rheometer, MDR model 2000 unit (Alpha Technologies, Hudson, OH), measuring under shear. For testing, 2.56 cm (1 inch) diameter circles were cut from the 1.905 mm (75 mil) (thickness) uncured plaques, and 2 of the 1.905 mm (75 mil) circles were stacked together. The stacked two 1.905 mm (75 mil) circles were tested at 182 °C for 12 minutes to obtain an MH and at 140 °C. (typical extrusion melt temperature) for varying lengths of time to get ts1. Both tests were performed at 0.5 degrees arc oscillation. MH is reported as the torque value when the curve plateaus. Desirably, MH is higher than 2.26 dN-m or <2 lbf-in. right after processing and does not change over time.

Scorch time or ts1 indicates cure kinetics useful for assessing resistance to premature crosslinking (scorch). For scorch time measurements, the reported value is the time required for increase of 1 unit (inch-lbf) or 1.13 deciNewton-meter (dN-m) from a minimum torque ("ML"). An acceptable ts1 at 140 °C should be at least 51 min or higher. The longer ts1, the better. Following equivalent definitions, other scorch metrics can be used, such as ts0.5, ts2, ts5 etc.

Tensile Strength and Elongation at Break Test Methods: measured on 75 mils thick, double pass compression molded plaques cured at 182 °C using a pulling speed of 50.8 centimeters (20 inches) per minute and a load of 45.3 kilograms (kg, 100 pounds (lbs)).

Viscosity Test Method: (oscillatory shear viscosity testing at low shear rate of 0.1 radian per second): a constant temperature frequency sweep was performed using a TA Instruments "Advanced Rheometric Expansion System (ARES)," equipped with 25 mm (diameter) parallel plates, under a nitrogen purge. Samples were placed on the plate and allowed to melt for five minutes at 135 °C. The plates were then closed to a gap set to 1.5 mm, the samples trimmed (extra sample that extends beyond the circumference of the "25 mm diameter" plate was removed), and then the tests were started. The method had an additional five minute delay built in to allow for temperature equilibrium. The tests were performed at 135 °C over a frequency range of from 0.1 radians per second (rad/s) to 100 rad/s at a constant strain amplitude of 25%.

EXAMPLES

Low-density polyethylene (LDPE-1). LDPE-1 is a thermoplastic polyolefin that has density 0.919 g/$cm^3$ and melt index $I_2$ of 3.9 g/10 min. Available from The Dow Chemical Company as AGILITY™ EC 7000.

Antioxidant Blend 1: a combination of lauryl thiodipropionate and stearyl thiodipropionate. Available as Cyanox 2212 from Solvay Chemicals.

Organic peroxide example: dicumyl peroxide ("DiCup" or "DCP") having a structure of formula $PhC(CH_3)_2$—O—O—$C(CH_3)_2Ph$, wherein Ph is phenyl.

Crosslinking coagent example 1: triallyl isocyanurate ("TAIC").

Crosslinking coagent example 2: 2,4,6,8-tetramethyl-2,4,6,8-tetravinyl-cyclotetrasiloxane ("Vinyl-D4").

The same amounts of the above compounds (LDPE-1, Antioxidant Blend 1, DiCup, TAIC, and Vinyl-D4) were used in the below Comparative Example 1 and Inventive Examples 1 to 4 except the methods used to prepare CE1 is a comparative soaking method described below and the method to prepare IE1 to IE4 comprises embodiments of the inventive method. The amounts are shown below in Table 1.

TABLE 1 amounts of compounds used in CE1 and IE1 to IE4:

| Ingredient | Type of Compound | Amount (wt %) |
|---|---|---|
| LDPE-1 | Thermoplastic polyolefin (TPO) | 98.20 |
| Antioxidant Blend 1 | Combination of two thio antioxidants | 0.15 |
| DiCup | Organic peroxide | 0.50 |
| TAIC | Crosslinking coagent | 0.30 |
| Vinyl-D4 | Crosslinking coagent | 0.85 |
| Total | Crosslinkable compound composition | 100.00 |

Preparation of Intermediate Compound 1: consisted of pellets of LDPE-1 and Antioxidant Blend 1 in the *relative* amounts shown in Table 1. The pellets were prepared by melt compounding the LDPE-1 and Antioxidant Blend 1 in a twin-screw extruder, followed by pelletizing using a Conair Model 304 strand pelletizer to give Intermediate Compound 1.

Comparative Example 1 (CE1): prepared CE1 by a comparative soaking method comprising preheating 250 grams of pellets of Intermediate Compound 1 at 70 °C for at least 4 hours to give preheated pellets; adding to the preheated pellets a liquid mixture of DiCup, TAIC, and Vinyl-D4 in the relative amounts shown in Table 1 to give a combination of preheated pellets and liquid mixture; tumbling the combination to evenly distribute the liquid mixture onto the preheated pellets; and heating the tumbled pellets/liquid combination at 70 °C overnight (at least 12 hours) to give Comparative Example 1 in the form of soaked pellets consisting of Intermediate Compound 1, DiCup, TAIC, and Vinyl-D4. The comparative crosslinkable compound composition of CE1 was tested according to the above-described test methods and the data are reported later in Table 3.

Production line example 1: used to run the inventive method of Inventive Examples 1 to 4 (IE1 to IE4): a melt compounding device and a post-compounding device. The melt compounding device was a 30 millimeter (mm) inner diameter Coperion ZSK-30 model twin screw extruder defining a conveying pathway therethrough and comprising, in series along the conveying pathway, at least the following zones: a melting/compounding zone configured for heating thermoplastic polyolefins above their melting temperatures and blending antioxidants thereinto and having one or more feed ports (a.k.a., feed points) for feeding one or more materials (e.g., pellets comprising thermoplastic polyolefins and antioxidants or antioxidant-free pellets comprising thermoplastic polyolefins and separate source of antioxidants) into the melting/compounding zone (e.g., from an external hopper, external feed line, or external storage tank), a mixing zone configured for rapid blending of curative additives into polymer melts and having one or more injection ports (a.k.a., injection points) located therebetween for injecting one or more materials including the curative additives into the mixing zone (e.g., from an external storage tank or feed line), and an output zone for discharging a melt stream of compounded material from the melt compounding device to the post-compounding device (e.g., a pelletizer or an extruder or a system comprising a melt pump, a melt screen, and the pelletizer or the extruder). The post-compounding device was a melt pump, a melt screen (housed in a filtration unit), and a pelletizer device comprising a pelletizing die.

Inventive Examples 1 to 4 (IE1 to IE4): prepared IE1 to IE4 using the production line example 1 described above and the inventive method processing conditions shown below in Table 2.

TABLE 2 processing conditions used for IE1 to IE4.

| | Processing Conditions | | | |
|---|---|---|---|---|
| | IE1 | IE2 | IE3 | IE4 |
| Total Production Rate | 20.4 kg/hour (45 lb/hour) | 18.2 kg/hour (40 lb/hour) | 20.4 kg/hour (45 lb/hour) | 15.9 kg/hour (35 lb/hour) |
| Extruder Die Type | None | Strand | None | None |
| Screen Mesh Number | None | 325 | None | None |
| Screw speed | 150 rpm* | 160 rpm | 175 rpm* | 175 rpm* |

TABLE 2-continued

| processing conditions used for IE1 to IE4. | | | | |
|---|---|---|---|---|
| | Processing Conditions | | | |
| Total Production Rate | IE1 20.4 kg/hour (45 lb/hour) | IE2 18.2 kg/hour (40 lb/hour) | IE3 20.4 kg/hour (45 lb/hour) | IE4 15.9 kg/hour (35 lb/hour) |
| Melt temperature** | 150° C. | 168° to 170° C. | 175° C. | 175° C. |
| Residence Time (calc.) | 31.4 sec | 42.1 sec | 31 sec | 35.2 sec |
| Number of Samples Tested*** | 1 | 3 | 1 | 1 |

*rpm = rotations per minute;

**melt temperature measured by hand-held probe;

***data reported in Table 3 are from 1 sample each of IE1, IE3 and IE4 and an average of the 3 samples of IE2 wherein the 3 samples of IE2 were taken about 1 hour apart.

As shown in Table 2 homogeneous mixtures of the inventive crosslinkable polymeric compositions were made in less than 60 seconds. Samples of the crosslinkable polymeric compositions were tested according to the above-described test methods. The data are reported below in Table 3.

TABLE 3

| properties of crosslinkable compound compositions of CE1 and IE1-IE4 | | | | | |
|---|---|---|---|---|---|
| Properties | CE1 | IE1 | IE2 | IE3 | IE4 |
| Number of Samples Tested | 1 | 1 | 3 | 1 | 1 |
| TS1 at 140° C., minutes | 89.6 | 104.4 | 102.6 | 80.3 | 63.0 |
| STDEV of TS1 at 140° C., minutes | N/a | N/a | 7.9 | N/a | N/a |
| MH at 182° C., dN-m (lbf-in.) | 1.99 (1.76) | 1.88 (1.66) | 1.89 (1.67) | 1.79 (1.58) | 1.95 (1.73) |
| STDEV of MH at 182° C., dN-m (lbf-in.) | N/a | N/a | 0.08 (0.07) | N/a | N/a |
| ML at 182° C., dN-m (lbf-in.) | 0.10 (0.09) | 0.11 (0.10) | 0.1 (0.1) | 0.11 (0.10) | 0.13 (0.11) |
| MH − ML (both at 182° C.), dN-m | 1.89 | 1.77 | 1.8 | 1.68 | 1.82 |
| Hot Creep at 200° C., % | 84.2 | 88.8 | 111 | 69.3 | 60.2 |
| Melt Index $I_{10}$ (120° C., 10 kg), g/10 min. | 6.0 | 5.5 | 5.7 | 5.5 | 4.1 |
| Viscosity (135° C., 0.1 radian/sec), kilopascal-seconds (kPa-sec) | 1.93 | 2.09 | 1.98 | 1.76 | 2.64 |
| Tensile Strength ("TS"), MPa (psi) | 17.06 (2474) | 15.79 (2290) | 15.89 (2304) | 17.24 (2500) | 15.38 (2230) |
| STDEV of TS, MPa (psi) | 0.752 109 | 2.28 (331) | 1.54 (224) | 1.70 (246) | 1.49 (216) |
| Elongation at Break ("E@B"), % | 474 | 460 | 510 | 448 | 406 |
| STDEV of E@B, % | 23 | 51 | 37 | 21 | 28 |

In Table 3, the data reported for IE2 are averages of three test samples taken about 1 hour apart during a continuous run. The individual Hot Creep data of the samples of IE2 were 121% (2bk), 110% (1bk), and 102% (1bk), wherein 2bk means two of three specimens broke and 1bk means one of three specimens broke. STDEV Means standard deviation. N/a means not applicable.

The data in Table 3 show that CE1 using the comparative soaking process, i.e., without modification via a high temperature compounding step, exhibits a melt index $I_{10}$ (120 °C, 10.0 kg) of 6.0 g/10 minutes and an ML at 182 °C of 0.1 lbf-in, which is low and indicative of no premature scorch. IE1 to IE4 are made via embodiments of the inventive ultrahigh temperature, low scorch melt compounding method and exhibit lower melt index $I_{10}$ values, indicating modification of the rheology of the thermoplastic polyolefin (in the examples LDPE-1) due to some initial decomposition of organic peroxide (DiCup in the examples) during the ultrahigh temperature compounding step, and yet the resulting inventive crosslinkable compound compositions retained appropriate levels of the combination of the curative additives (DiCup, TAIC, and Vinyl-D4 in the examples) and exhibited sufficient levels of crosslinking as shown by their MH at 182 °C values. The MH at 182 °C values of IE1 to IE4 are surprisingly about the same as the MH at 182 °C value for the comparative soaked crosslinkable compound composition of CE1. Also in Table 3 are results of oscillatory shear viscosity testing at low shear rate of 0.1 radian per second. Available upon request are relaxation spectra data.

The above Detailed Description teach the inventive method and the results of IE1 to IE4 demonstrate that the method and its benefits are achieved.

TABLE 4

| amounts of compounds used in CE2 (actual). | | |
|---|---|---|
| Ingredient | Type of Compound | Amount (wt %) |
| LDPE-1 | Thermoplastic polyolefin (TPO) | 99.85 |
| Antioxidant Blend 1 | Combination of two thio antioxidants | 0.15 |
| DiCup | Organic peroxide | 1.4 |
| TAIC | Crosslinking coagent | 0.00 |
| Vinyl-D4 | Crosslinking coagent | 0.00 |
| AMSD | Scorch retarder | 0.35 |
| Total | Crosslinkable compound composition | 100.00 |

TABLE 5 amounts of compounds used in Inventive Example 5.

| Ingredient | Type of Compound | Amount (wt %) |
|---|---|---|
| LDPE-1 | Thermoplastic polyolefin (TPO) | 99.85 |
| Antioxidant Blend 1 | Combination of two thio antioxidants | 0.15 |
| DiCup | Organic peroxide | 1.4 |
| TAIC | Crosslinking coagent | 0.50 |
| Vinyl-D4 | Crosslinking coagent | 0.00 |
| AMSD | Scorch retarder | 0.00 |
| Total | Crosslinkable compound composition | 100.00 |

TABLE 6 amounts of compounds used in Inventive Example 6.

| Ingredient | Type of Compound | Amount (wt %) |
|---|---|---|
| LDPE-1 | Thermoplastic polyolefin (TPO) | 99.85 |
| Antioxidant Blend 1 | Combination of two thio antioxidants | 0.15 |
| DiCup | Organic peroxide | 1.4 |
| TAIC | Crosslinking coagent | 0.00 |
| Vinyl-D4 | Crosslinking coagent | 0.50 |
| AMSD | Scorch retarder | 0.00 |
| Total | Crosslinkable compound composition | 100.00 |

Comparative Example 2 (actual) and Inventive Examples 5 and 6 (IE5 and IE6) (prophetic): were/are prepared using the production line example 1 and the inventive method processing conditions shown in Table 2.

TABLE 7 actual properties of crosslinkable compound composition of CE2 and expected properties of crosslinkable compound composition of IE5 and IE6. Bracketed data ("[]") indicate predicted values, e.g., [100] for TS1 at 140° C. indicates 100 minutes are predicted.

| Properties | CE2 (actual) | IE5 (Prophetic) | IE6 (Prophetic) |
|---|---|---|---|
| Number of Samples Tested | 1 | 1 | 1 |
| TS1 at 140° C., minutes | >120 | [100] | [100] |
| MH at 182° C., dN-m | 1.56 | [1.8] | [1.8] |
| ML at 182° C., dN-m | 0.1 | [0.1] | [0.1] |
| MH − ML (both at 182° C.), dN-m | 1.46 | [1.7] | [1.7] |
| Hot Creep at 200° C., % | 243 | [100] | [100] |
| Melt Index $I_{10}$ (120° C., 10 kg), g/10 min. | 5.25 | [5] | [5] |
| Viscosity (135° C., 0.1 radian/sec), kilopascal-seconds (kPa-sec) | 2.17 | [2] | 2] |
| Tensile Strength ("TS"), MPa (psi) | 13.44 (1949) | [15] | [15] |
| Elongation at Break ("E@B"), % | 448 | [460] | [510] |

As shown in Table 7, as expected the scorch retarder AMSD afforded CE2 a time to scorch TS1 at 140 °C of greater than 120 minutes (>120 minutes). However because AMSD has only one carbon-carbon double bond per molecule it is not, and cannot function as, the multi-alkenyl crosslinking coagent. Therefore, even though CE2 was made via embodiments of the inventive ultrahigh temperature, low scorch melt compounding method, it did not show the inventive improvement but had inferior MH and MH-ML at 182 °C, inferior hot creep at 200 °C, inferior tensile strength, and inferior elongation at break. CE2 shows that comparative methods that do not use a multialkenyl crosslinking coagent cannot achieve the inventive improvements.

In contrast in Table 7, if IE5 and IE6 would be made via embodiments of the inventive ultrahigh temperature, low scorch melt compounding method, they are predicted to exhibit lower melt index $I_{10}$ values, indicating modification of the rheology of the thermoplastic polyolefin (in the examples LDPE-1) due to some initial decomposition of organic peroxide (DiCup in the examples) during the ultrahigh temperature compounding step, and yet the resulting inventive crosslinkable compound compositions retained appropriate levels of the combination of the curative additives (DiCup and either TAIC or Vinyl-D4 but not both) and exhibited sufficient levels of crosslinking as shown by their MH at 182 °C values. IE5 and IE6 show that embodiments of the method wherein the combination of curative additives comprises one or more organic peroxides and only one multialkenyl crosslinking coagent are expected to show the inventive improvements.

The invention claimed is:

1. An ultrahigh temperature, low-scorch method of making a crosslinkable compound composition comprising a homogeneous mixture of one or more thermoplastic polyolefins, one or more antioxidants, and a combination of curative additives comprising one or more organic peroxides and one or more multialkenyl crosslinking coagents, the method comprising:

providing a melt compounding device sequentially having a solids conveying section, a melting/mixing zone, and an ultrahigh temperature mixing zone, wherein the temperature of the ultrahigh temperature mixing zone is from 150.1 °C to 180.0 °C;

feeding to the melting/mixing zone of the melt compounding device any one of materials (a) to (c): (a) a pellets/coagent(s) premixture made by contacting solid pellets of an intermediate compound, which at the start comprises one or more thermoplastic polyolefins and one or more antioxidants, but lacks peroxides and multialkenyl crosslinking coagents, with one or more multialkenyl crosslinking coagents, or (b) a pellets/coagent(s)/organic peroxide(s) premixture made by contacting solid pellets of an intermediate compound, which at the start comprises one or more thermoplastic polyolefins and one or more antioxidants, but lacks peroxides and multialkenyl crosslinking coagents, with a combination of curative additives comprising one or more multialkenyl crosslinking coagents and one or more organic peroxides; or (c) solid pellets of an intermediate compound, which at the start comprises one or more thermoplastic polyolefins and one or more antioxidants, but lacks peroxides and multialkenyl crosslinking coagents, wherein material (c) lacks curative additives;

melting and first mixing the one or more thermoplastic polyolefins with the other constituents of the material (a), (b), or (c) for 15 to 35 seconds to yield an initial melted mixture thereof in the melting/mixing zone;

moving the initial melt mixture into the ultrahigh temperature mixing zone of the melt compounding device;

optionally injecting one or more multialkenyl crosslinking coagents and/or one or more organic peroxides, collectively "curative additive(s)", into the initial melt in the ultrahigh temperature mixing zone, wherein the injecting of one or more organic peroxides is performed if the material (a) is fed and the injecting of one or more multialkenyl crosslinking coagents and/or one or more organic peroxides is performed if the material (c) is fed; and second mixing the material (a), (b), or (c) and any injected curative additive(s) in the ultrahigh temperature mixing zone for 10 to 20 seconds; and discharging the resulting crosslinkable compound composition from the melt compounding device;

wherein the total residence time of the material (a), material (b), or material (c) in the melt compounding device is from 25 to 55 seconds and wherein the total residence time of any injected curative additive(s) in the melt compounding device is from 10 to 30 seconds.

2. The method as claimed in claim 1 wherein the material (a) is fed and the injecting is performed comprising injecting the one or more organic peroxides, and optionally one or more additional multialkenyl crosslinking coagents, into the initial melt in the ultrahigh temperature mixing zone of the melt compounding device and the second mixing step comprises mixing the material (a) and the injected curative additives.

3. The method as claimed in claim 1 wherein the material (b) is fed and the injecting is not performed and the second mixing step comprises mixing material (b) and wherein no additional curative additives are injected.

4. The method as claimed in claim 1 wherein the material (b) is fed and the injecting step is performed and comprises injecting one or more additional multialkenyl crosslinking coagents and/or one or more additional organic peroxides into the initial melt in the ultrahigh temperature mixing zone of the melt compounding device and the second mixing step comprises mixing the material (b) and the injected curative additives.

5. The method as claimed in claim 1 wherein the material (c) is fed, the method comprising feeding the pellets of the intermediate compound into the melting/mixing zone of the melt compounding device to yield a melt of an intermediate compound comprising the one or more thermoplastic polyolefins and the one or more antioxidants, but lacking peroxides and multialkenyl crosslinking coagents, wherein the melt of the intermediate compound is at a melt temperature of 150.1° to 180.0 °C;

injecting the combination of curative additives comprising the one or more organic peroxides and the one or more multialkenyl crosslinking coagents into the melt of the intermediate compound; and mixing the combination of curative additives into the melt of the intermediate compound to make the crosslinkable compound composition in the form of a melt comprising the homogeneous mixture, wherein the homogeneous mixture is formed in from 20 seconds to less than 60 seconds after completion of the injecting step.

6. The method as claimed in claim 5 adapted to the melt compounding device, the melt compounding device defining a conveying pathway therethrough and comprising, in series along the conveying pathway, at least the following zones: a melting/compounding zone configured for heating thermoplastic polyolefins above their melting temperatures and blending antioxidants thereinto and having one or more feed ports for feeding one or more materials into the melting/compounding zone, a mixing zone configured for rapid blending of curative additives into polymer melts and having one or more injection ports located therebetween for injecting one or more materials including the curative additives into the mixing zone, and an output zone for discharging a melt stream of compounded material from the melt compounding device to a post-compounding device; the method comprising:

(A) providing the melt of the intermediate compound to, or making the melt of the intermediate compound in, the melting/compounding zone;

(B) conveying the melt of the intermediate compound into the mixing zone;

(C) injecting, via at least one of the one or more injection ports of the mixing zone, the combination of curative additives comprising the one or more organic peroxides and the one or more multialkenyl crosslinking coagents into the melt of the intermediate compound; and (D) mixing the combination of curative additives and the melt of the intermediate compound in the mixing zone to make the melt of the crosslinkable compound composition comprising the homogeneous mixture, wherein the homogeneous mixture is formed in from 20.0 to 60.0 seconds after completion of the injecting step; and (E) conveying the melt of the crosslinkable compound composition to the output zone.

7. The method as claimed in claim 5 comprising post-output zone steps adapted to an insulation extrusion machine configured with an annular die for extrusion coating a filament, the post-output zone steps comprising conveying the melt of the crosslinkable compound composition from the output zone of the melt compounding device into the insulation extrusion machine; extruding an insulating layer of the crosslinkable compound composition onto a conductor to make a coated conductor; and curing the crosslinkable compound composition of the insulation layer to make the cable.

8. The method as claimed in claim 5 wherein the injecting step has limitation (i) or limitation (ii): (i) wherein the injecting step consists of injecting the combination of curative additives together as a mixture thereof, or (ii) wherein the injecting step consists of injecting at least one, or all but one, or each of the curative additives separately from the other curative additives.

* * * * *